United States Patent
Scrimshaw et al.

(10) Patent No.: US 8,387,719 B2
(45) Date of Patent: Mar. 5, 2013

(54) MECHANICAL ASSEMBLY FOR A POWER TOOL

(75) Inventors: David Leigh Scrimshaw, Braeside (AU); Benjamin Luke Van der Linde, Braeside (AU); Paul Francis Connor, Braeside (AU); Paul Miller, Braeside (AU)

(73) Assignee: Demain Technology Pty Ltd, Victoria (AU)

( * ) Notice: Subject to any disclaimer, the term of this patent is extended or adjusted under 35 U.S.C. 154(b) by 388 days.

(21) Appl. No.: 12/676,559

(22) PCT Filed: Sep. 5, 2008

(86) PCT No.: PCT/AU2008/001325
§ 371 (c)(1),
(2), (4) Date: Apr. 26, 2010

(87) PCT Pub. No.: WO2009/029997
PCT Pub. Date: Mar. 12, 2009

(65) Prior Publication Data
US 2010/0200257 A1    Aug. 12, 2010

(30) Foreign Application Priority Data
Sep. 6, 2007  (AU) ................................ 2007904849

(51) Int. Cl.
*F16H 1/14*  (2006.01)
*B25F 5/00*  (2006.01)
(52) U.S. Cl. .......... 173/47; 173/217; 173/176; 173/178; 173/180; 173/104; 279/60; 279/61; 279/62; 74/333; 74/473.3; 408/238

(58) Field of Classification Search .............. 173/47, 173/216, 176, 178, 180, 104; 408/238; 279/60–62, 279/902; 74/333, 473.3
See application file for complete search history.

(56) References Cited

U.S. PATENT DOCUMENTS

| | | | | |
|---|---|---|---|---|
| 2,716,555 A | * | 8/1955 | Rowe | 279/56 |
| 2,791,142 A | * | 5/1957 | Lyon | 81/57.26 |
| 3,506,277 A | * | 4/1970 | Harms | 279/63 |
| 4,014,421 A | | 3/1977 | Johnson | |

(Continued)

FOREIGN PATENT DOCUMENTS

| | | |
|---|---|---|
| EP | 1086767 A1 | 3/2003 |
| GB | 2378488 A | 2/2003 |

(Continued)

*Primary Examiner* — Brian D Nash
*Assistant Examiner* — Michelle Lopez
(74) *Attorney, Agent, or Firm* — Fitch Even Tabin & Flannery LLP

(57) ABSTRACT

A mechanical assembly for a power tool, and a power tool incorporating the mechanical assembly are provided. The mechanical assembly includes (i) a first member having a first axis and a first engagement portion inclined relative to the first axis, (ii) a second member having a second axis and a second engagement portion inclined relative to the second axis, wherein the first and second engagement portions engage each other by movement of the first and second members relative to each other in the direction of at least one of the axes; and wherein the first member is a ring gear and the second member is a central gear and the first and second engagement portions engage and disengage each other by movement of the second member within a space defined within the first member.

48 Claims, 14 Drawing Sheets

U.S. PATENT DOCUMENTS

| | | | |
|---|---|---|---|
| 4,139,207 A | | 2/1979 | Grimes |
| 7,021,400 B2 * | | 4/2006 | Oretti ............................. 173/29 |
| 7,331,584 B2 * | | 2/2008 | Zhang et al. .................... 279/60 |
| 7,722,300 B1 * | | 5/2010 | Corcoran ....................... 408/240 |
| 7,942,211 B2 * | | 5/2011 | Scrimshaw et al. ............. 173/48 |
| 2003/0196824 A1 * | 10/2003 | Gass et al. ................... 173/131 |
| 2004/0035267 A1 | | 2/2004 | Liao |
| 2009/0200053 A1 * | 8/2009 | Scrimshaw et al. ............. 173/47 |

FOREIGN PATENT DOCUMENTS

| | | |
|---|---|---|
| WO | 9528245 A1 | 10/1995 |

* cited by examiner

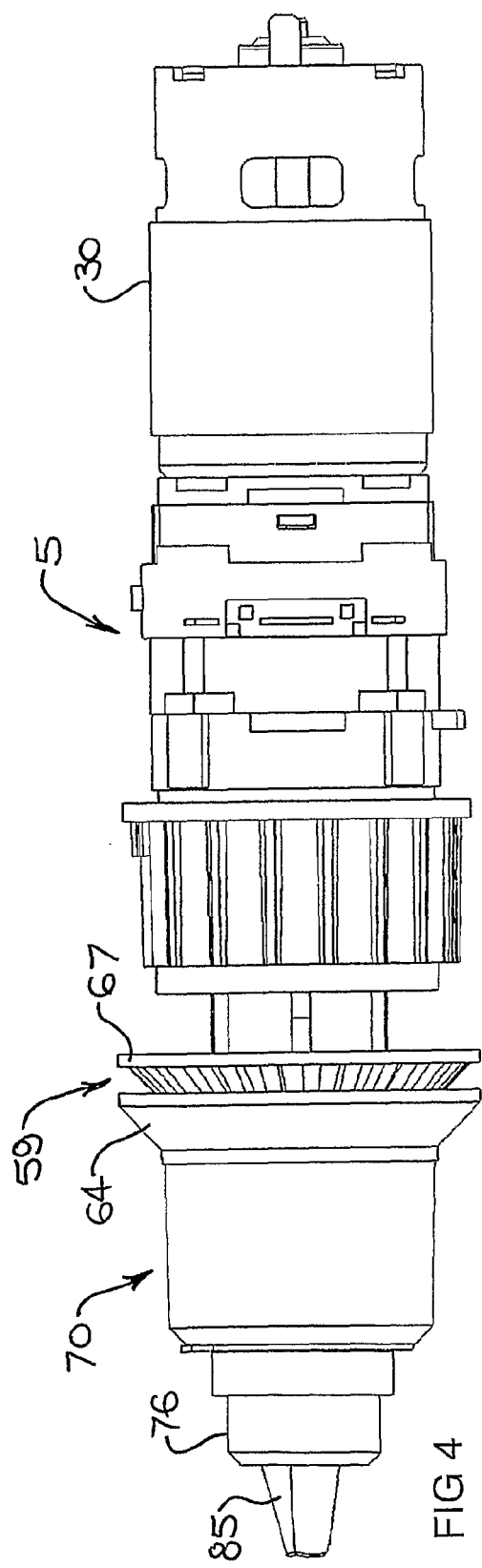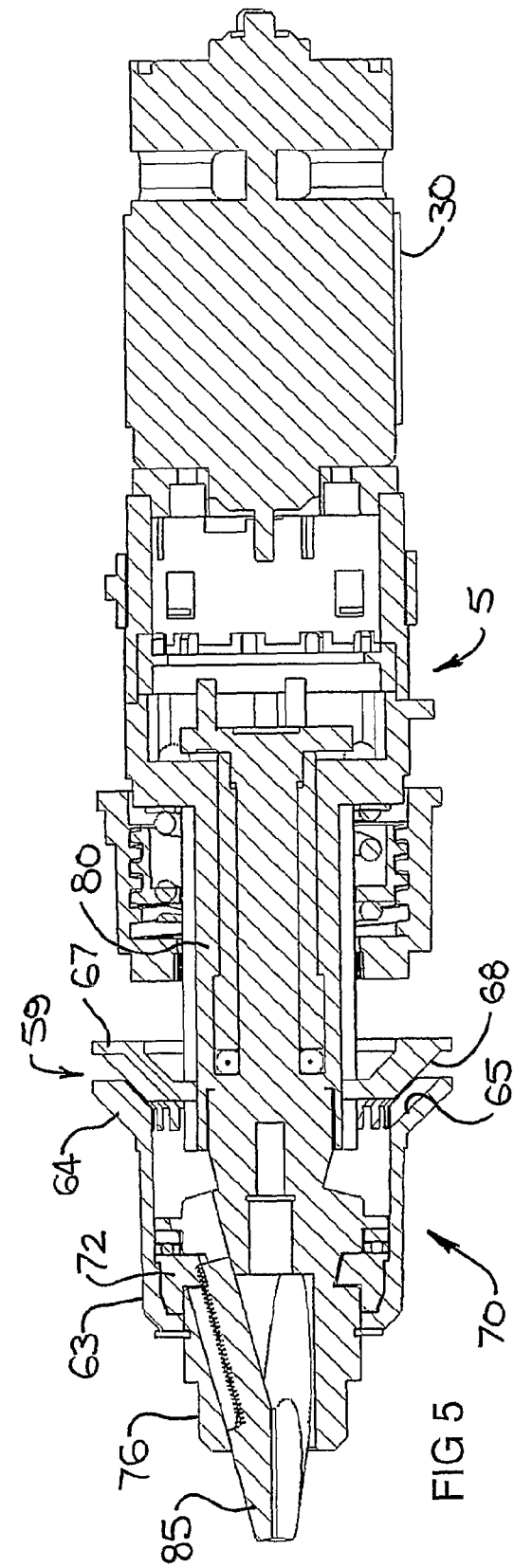
FIG 4
FIG 5

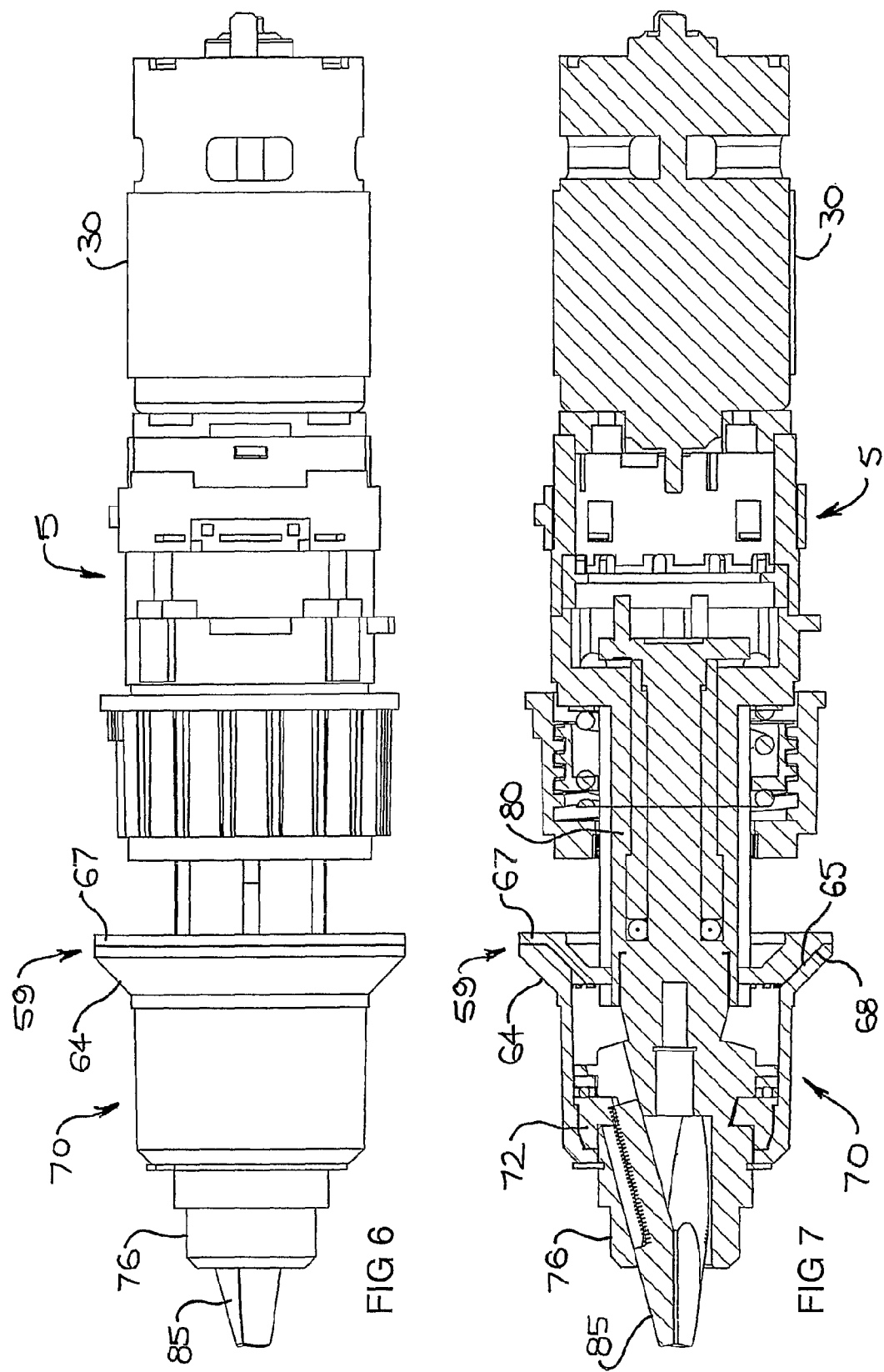

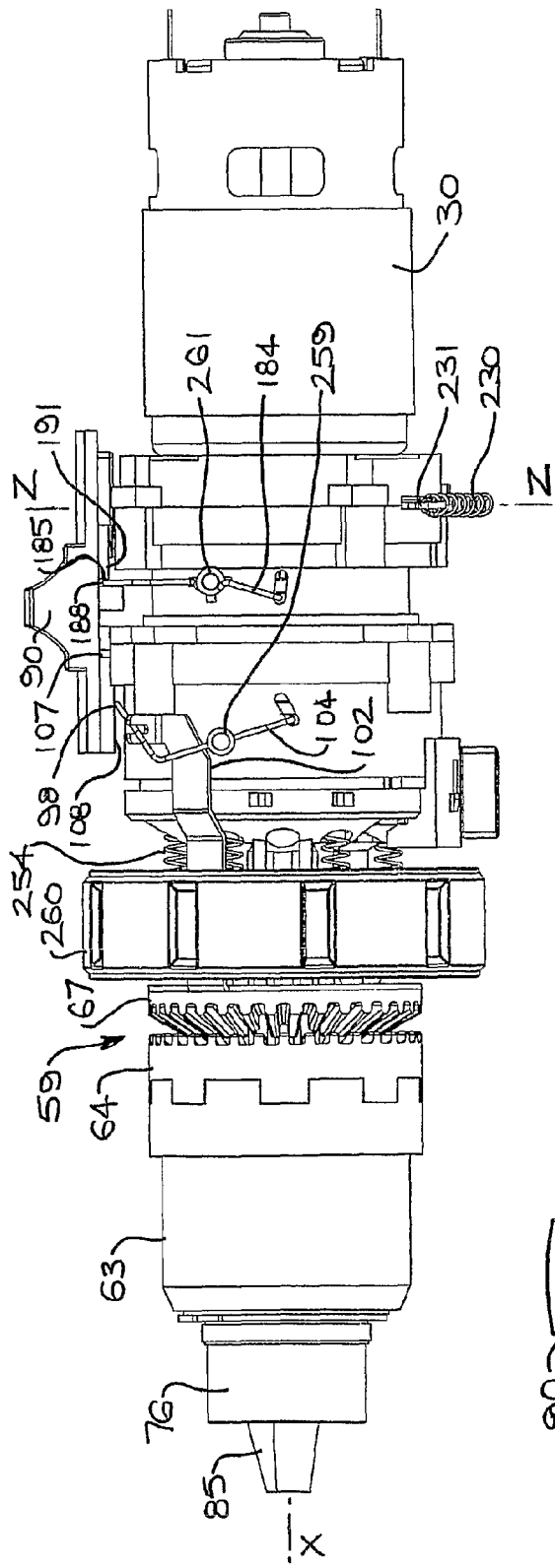
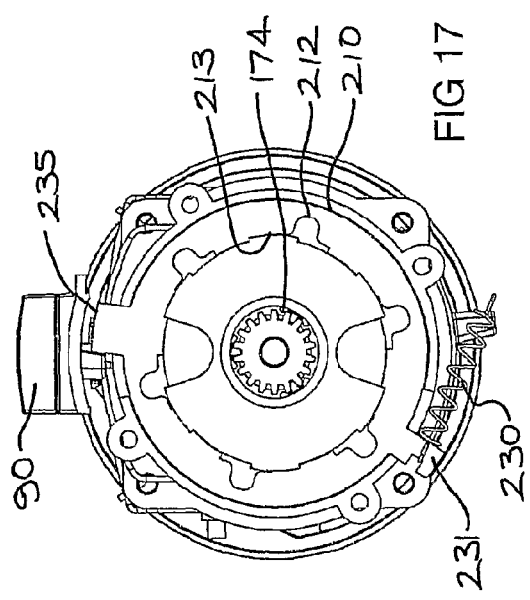

MECHANICAL ASSEMBLY FOR A POWER TOOL

FIELD OF THE INVENTION

This invention relates to power tools. The invention is suitable for use with power tools that use a drill bit, a saw blade, a cutting wheel or any other element used to cut shape or otherwise treat a workpiece. The invention is particularly suitable for use with power tools incorporating a driven member that is operable for releasably gripping a working element.

A power drill is one form of power tool with which the invention is applicable. For the sake of convenience the invention is described below in the context of power drills, but it is to be understood that the invention may have broader application.

BACKGROUND OF THE INVENTION

Most existing power drills have a three jaw chuck for gripping a drill bit. The chuck jaws are adjustable to suit drill bits of various sizes. In most cases such adjustment is carried out by use of a key or by manually twisting the outer sleeve of the chuck or alternatively the user grips the outer sleeve and power is applied to the chuck, whereby the user provides a resistance force.

Other existing power drills, however, incorporate means for adjusting the chuck jaws which do not require a key or manually twisting the outer sleeve of the chuck or gripping the outer sleeve and applying power to the chuck, whereby the user provides a resistance force. One such existing power drill instead includes an adjustment mode and a drive mode. In the adjustment mode operation of a drive motor causes adjustment of the chuck and in the drive mode operation of the drive motor causes rotation of the chuck along with a working element gripped by the chuck for, say, drilling a hole into a workpiece.

Existing power drills that include an adjustment mode and a drive mode can include a mechanical assembly that is operable in providing the adjustment and drive modes and for switching between modes. However, in such power drills the mechanical assembly is typically located between the drive motor and the chuck and this can add considerably to the length of the power drill between the drive motor and the chuck and to the length of the power drill overall. This is a particular disadvantage when power tools incorporating a mechanical assembly such as the one described above are being marketing in competition with more compact power drills that do not incorporate such a mechanical assembly, such as power drills that do not include adjustment and drive modes.

In the field of power tools, in particular hand held power tools, it is desirable to be able to provide a power tool that is compact in order that the tool may be easily handled and be able to access confined spaces. Accordingly, whilst existing mechanical assemblies that provide adjustment and drive modes for a power tool may serve the purpose of providing adjustment and drive modes there is a need for a power tool, that provides adjustment and drive modes, and that is as short as possible.

Accordingly, it would be advantageous to be able to provide a mechanical assembly for a power tool that is operable for providing adjustment and drive modes for a driven member, such as a chuck, that is short in length. It would also be advantageous to be able to provide a mechanical assembly for incorporation in a power tool that is operable for providing adjustment and drive modes for a driven member and that provides a power tool that is compact.

Some existing power drills have a drive mode and an adjustment mode. When in the adjustment mode operation of a drive motor of the power tool causes the jaws of a chuck to move either towards or away from each other to either clamp or release a working element. When in the drive mode operation of the drive motor of the power tool causes rotation of the chuck along with a working element gripped by the chuck. Such power drills can include a torque control means for controlling the amount of torque applied by the drive motor to the chuck when the power drill is in the drive mode. However, the amount of torque that the torque control means allows to be applied may not be an appropriate amount of torque to prevent damage to the power tool or the working element when the power dill is in the adjustment mode for clamping or releasing a working element. In other words, the amount of torque required in the drive mode may be different to the amount of torque required in the adjustment mode. Thus, existing power tools incorporating adjustment and drive modes and a torque control means for controlling the amount of torque applied by the motor require a user to alter the torque control setting of the torque control means between when operating the power tool in the adjustment mode and when operating the power tool in the drive mode. In power tools in which the torque control means involves manually rotating a knob through a range of graduated torque settings or some other equivalent manual adjustment means, it is not convenient to have to adjust the torque control means whenever the user wishes to operate the power tool in the adjustment mode and the drive mode.

Accordingly, it would be advantageous to provide a power tool incorporating an adjustment mode and a drive mode and a torque control means which did not require the user to adjust the torque control means between when operating the power tool in the adjustment mode and the drive mode.

SUMMARY OF THE INVENTION

Accordingly, in one aspect, the present invention provides a mechanical assembly for a power tool, the mechanical assembly including:

a first member having a first axis and a first engagement portion inclined relative to the first axis;

a second member having a second axis and a second engagement portion inclined relative to the second axis;

wherein the first and second engagement portions engage each other by movement of the first and second members relative to each other in the direction of at least one of the axes The present invention is advantageous over existing mechanical assemblies for power tools in that it provides first and second members that each include engagement portions that are inclined relative to the axes of the members. Thus, the invention enables the overall length of the members in the direction of the axes to be reduced while still providing engagement portions of a length and/or surface area sufficient to provide secure engagement therebetween. This facilitates providing a power tool that is compact, particularly in the direction of the axes of the first and second members, while still providing secure engagement therebetween. Furthermore, the invention may achieve the above outcomes without requiring a relatively large amount of force acting on either the first or the second member in the direction of either one of the axes of the first and second members to urge the either the first or the second member into secure engagement with the other one of the first and second members. For example, the relatively large length and/or surface area of the engagement portions resulting from their inclined configuration in the above arrangement does not require an excessively large force to act on either the first or the second member to ensure that the engaging portions do not slip or otherwise come out of engagement.

In one form, the first and second axes extend in the same direction and the first and second engagement portions engage each other by movement of the first and second members relative to each other in the direction of at least one of the axes.

In another form, the first engagement portion is conical and the second engagement portion is conical. For example, the first and second engagement portions may be bevelled. These forms of the invention are advantageous in that it provides first and second members with engagement portions that have a length of interengagement that is comparable to that of first and second members with, say, cylindrical and/or axially extending engagement portions yet with a comparatively shorter length in the axial direction.

In another form, the first engagement portion includes elongated splines for mating with elongated recesses of the second engagement portion and the second engagement portion includes elongated splines for mating with elongated recesses of the first engagement portion, wherein each spline and recess is elongated in a direction that converges with the axis of the member with which the spline or recess is associated.

In yet another form, the first member is a ring gear and the second member is a central gear and the first and second engagement portions engage and disengage each other by movement of the second member within a space defined within the first member. This embodiment of the invention is advantageous in that the second member, which is a central gear, need not move completely outside the space defined within the first member, which is a ring gear, in order for the first and second engagement portions to have a sufficient range of relative motion to engage and disengage each other. This further enhances the ability of the invention to provide a mechanical assembly of reduced overall length in the direction of the axes.

In one form, the first member is rotatable relative to the first axis and the second member is not rotatable relative to the second axis so that when the first and second engagement portions are in engagement the first member is prevented from rotating relative to the first axis. This form of the invention is advantageous in situations where it is necessary to have a mechanical assembly that facilitates prevention of rotation of the first member relative to its axis of rotation by engagement with the second member.

In another form, the first member is connected to a first thread in engagement with a second thread so that when the first member is prevented from rotating relative to the first axis, rotation of the second thread relative to the first member results in rotation of the first and second threads relative to each other and movement of the second thread in a linear path that is angularly displaced relative to the first axis. The above forms of the invention are advantageous in that they provide a mechanical assembly that facilitates movement of one threaded part relative to another threaded part by rotation of the one threaded part and the prevention of rotation of the other threaded part caused by preventing rotation of the first member relative to its axis of rotation by engagement with the second member.

In one form, the mechanical assembly is incorporated in a power tool. This form of the invention is advantageous in that it provides a mechanical assembly in a power tool that enables the power tool to be compact yet which also includes some or all of the advantages set out above. Preferably, at least part of the mechanical assembly forms part of a chuck of a power drill. This form of the invention facilitates a power drill incorporating a mechanical assembly that is compact yet which also includes some or all of the advantages of the invention set out above.

In another form, the mechanical assembly is operable for providing adjustment and drive modes for a driven member of a power tool, such as a chuck. This form of the invention is advantageous in that the mechanical assembly is operable for providing adjustment and drive modes for a driven member of a power tool yet because the engagement portions have an inclined configuration results in a power tool that is short in length and/or compact.

In one form, the mechanical assembly is a gear assembly, the first member is a gear and the second member is a gear.

In another aspect, the present invention includes a power tool including:

a power tool body;

a rotatable driven member being operable for releasably gripping a working element, the driven member having a drive mode in which rotation of the driven member drives the working element relative to the power tool body and an adjustment mode in which rotation of the driven member causes the driven member to either grip the working element or release the working element or both; and means for adjusting the driven member between the modes including a first member having a first axis and a first engagement portion inclined relative to the first axis and a second member having a second axis and a second engagement portion inclined relative to the second axis, wherein the first and second engagement portions engage each other by movement of the first and second members relative to each other in the direction of at least one of the axes;

wherein engagement between the first and second engagement portions adjusts the driven member to the adjustment mode and disengagement between the first and second engagement portions adjusts the driven member to the drive mode.

In one form, a power drive drives rotation of the driven member.

Forms of the above power tool are advantageous over existing power tools, particularly power drills, in that by operating the power tool motor a user can grip, release or drive rotation of a working element, such as a drill or screwdriver bit, by either selectively engaging or disengaging the engagement portions of the first and second members. Furthermore, the first and second members may have overall lengths in the direction of one of the axes that are less than the overall lengths of engagement members of existing power tools serving a similar function while still providing engagement portions of a length and/or surface area sufficient to provide secure engagement therebetween. Accordingly, the power tool may be more compact, particularly in the direction of the axes, than would otherwise be the case while still providing secure engagement between the members. Furthermore, the invention may achieve the above outcomes without requiring a relatively large amount of force acting on the second member in the direction of the axis of the first and/or the second member to urge either the first or the second member into secure engagement with the other one of the first and the second member.

In one form, the first and second axes extend in the same direction and the first and second engagement portions engage and disengage each other by movement of the first and second members relative to each other in the direction of the first and/or the second axis.

In another form, the first engagement portion is conical and the second engagement portion is conical. In yet another form, the first and second engagement portions may be bevelled. These forms are advantageous in that they provide means for adjusting the driven member between the drive mode and the adjustment mode that includes first and second members with engagement portions that have a length of interengagement that is comparable to that of first and second members with, say, cylindrical and/or axially extending engagement portions yet with a comparatively shorter length in the axial direction. Accordingly, the overall length of the power tool incorporating the above forms of the invention may be shorter than the overall length of a power tool incorporating means for adjusting the driven member that include, say, cylindrical and/or axially extending engagement portions.

In another form, the first engagement portion includes elongated splines for mating with elongated recesses of the second engagement portion and the second engagement portion includes elongated splines for mating with elongated recesses of the first engagement portion, wherein each spline and recess is elongated in a direction converging with the axis of the member with which the spline or recess is associated.

In another form, the first member is a ring gear and the second member is a central gear and the first and second engagement portions thereof engage and disengage each other by movement of the second member within a space defined within the first member. This form is advantageous in that the second member, which may be a bevelled central gear, need not move completely out of the space defined within the first member, which may be a bevelled ring gear, in order for the first and second engagement portions to have a sufficient range of relative motion in the axial direction to engage and disengage each other. This further enhances the ability of the invention to provide a power tool including means for adjusting the driven member between the drive mode and the adjustment mode of reduced overall length in the axial direction compared with a power tool including first and second engagement portions involving axially aligned engagement portions such as standard ring and central gears with teeth which extend in the axial direction.

In yet another form, the first member is rotatable relative to the first axis and the second member is not rotatable relative to the second axis so that when the first and second engagement portions are in engagement the first member is prevented from rotating relative to the first axis.

In still yet another form, the driven member includes a jaw member for releasably gripping the working element, the first member including a first thread and the jaw member including a second thread in engagement with the first thread so that when the first member is prevented from rotating relative to the first axis, rotation of the jaw member relative to the first member caused by rotation of the driven member results in rotation of the first and second threads relative to each other and movement of the jaw member in a linear path that is angularly displaced relative to the first axis.

In another form, the power tool further includes an actuator member for moving the first and second members relative to each other in the direction of at least one of the first and second axes. Preferably, the actuator member is movable between a first setting in which the actuator member urges the first and second members towards each other to cause engagement between the first and second engagement portions and a second setting in which the actuator member urges the first and second members away from each other to cause disengagement between the first and second engagement portions. These forms of the invention are advantageous in that by urging the first and second members into engagement in the actuator ameliorates the problem of crashing of the first and second members which may include first and second engagement portions with splines that are otherwise prone to crashing. Even if the splines of one engagement member meet directly with splines of the other engagement member and not directly with recesses between the splines the actuator member continues to urge the gears into engagement until, as a result of some relative rotation of the gears, the splines and recesses line up and engage each other.

In another aspect, the invention provides a power tool including:

a power tool body;

a rotatable driven member being operable for releasably gripping a working element, the driven member having a drive mode in which rotation of the driven member drives the working element relative to the power tool body and an adjustment mode in which rotation of the driven member causes the driven member to either grip the working element or release the working element or both, a power drive for driving rotation of the driven member;

a first torque control means for controlling an amount of torque applied to the driven member by the power drive when in the drive mode; and a second torque control means for controlling the amount of torque applied to the driven member by the power drive when in the adjustment mode.

The above form of the invention is advantageous in that by including the second torque control means the power tool provides a means for controlling the torque applied by the power drive to the driven member to ensure that the amount of torque is not so great as to damage the power tool or crush the working element when operating the power tool in the adjustment mode to clamp or release the working element. Arrangements in which the first torque control means provides for adjustment between torque settings is advantageous in that it is not necessary to alter the torque setting of the first torque control means between when operating the power tool in the adjustment mode and when operating the power tool in the drive mode. In other words, in the above form of the invention which includes the second torque control means it is not necessary to have to adjust the torque setting of the first torque control means whenever the user wishes to operate the power tool in the adjustment mode as opposed to the drive mode in order to have an appropriate amount of torque for the drive mode.

In one form, the first torque control means is operable for controlling the amount of torque applied to the driven member by the power drive in the drive mode and is not operable in the adjustment mode. In another form, the second torque control means is operable for controlling the amount of torque applied to the driven member by the power drive in the adjustment mode and is not operable in the drive mode.

In another form, the first torque control means has a plurality of torque settings and is adjustable between the plurality of torque settings. In yet another form, the second torque control means has a single torque setting.

In another form the second torque control means has a plurality of torque settings.

In one form, the power tool includes a gearbox including a plurality of speed settings wherein in each one of the plurality of speed settings the gearbox is operable for converting rotation from the power drive into a respective relative speed of rotation of the driven member.

In another form, the power tool includes a gearbox including a first speed setting and a second speed setting, in the first speed setting the gearbox is operable for converting rotation from the power drive into a first speed of rotation of the driven member, in the second speed setting the gearbox is operable for converting rotation from the power drive into a second speed rotation of the driven member.

In yet another form, the power tool further includes an adjustment means for adjusting the driven member between the drive mode and the adjustment mode.

In one form, the adjustment means includes a first member having a first axis and a first engagement portion inclined relative to the first axis and a second member having a second axis and a second engagement portion inclined relative to the second axis. In one form, the first engagement portion is conical and the second engagement portion is conical. In another form, the first and second engagement portions are bevelled. The first member may be a bevelled ring gear and the second member may be a bevelled central gear and the first and second engagement portions thereof engage and disengage each other by movement of the central gear within a space defined within the ring gear. This form is advantageous in that the second member, which is a bevelled central gear, need not move completely out of the space defined within the first member, which is a bevelled ring gear, in order for the first and second engagement portions to have a sufficient range of relative motion in the axial direction to engage and disengage each other.

In an alternative form, the adjustment means includes a first member having a first axis and a first engagement portion extending in the same direction as the first axis and a second member having a second axis and a second engagement portion extending in the same direction as the second axis.

The first and second axes may extend in the same direction and the first and second engagement portions may engage and disengage each other by movement of the first and second members relative to each other in the direction of the axes. Furthermore, engagement between the first and second engagement portions may adjust the driven member to the adjustment mode and disengagement between the first and second engagement portions may adjust the driven member to the drive mode.

In one form, the adjustment means includes an actuator member for urging the first and second members relative to each other in the direction of the axes or at least one of the axes. Preferably, the actuator member is movable between a first setting in which the actuator member urges the first and second members towards each other to cause engagement between the first and second engagement portions, and a second setting in which the actuator member urges the first and second members away from each other to cause disengagement between the first and second engagement portions.

In another form, the power tool further includes a switch connected to the actuator member, the switch being actuable between a position in which the actuator member is in the first setting and a position in which the actuator member is in the second setting.

In another aspect, the present invention provides a power tool including:
a power tool body;
a rotatable driven member being operable for releasably gripping a working element, the driven member having a drive mode in which rotation of the driven member drives the working element relative to the power tool body and an adjustment mode in which rotation of the driven member causes the driven member to either grip the working element or release the working element or both,
a power drive for driving rotation of the driven member;
a first torque control means that is operable for controlling the amount of torque applied to the driven member by the power drive when in the drive mode;
a second torque control means that is operable for controlling the amount of torque applied to the driven member by the power drive when in the adjustment mode,
a gearbox including a first speed setting for converting rotation from the power drive into a first speed of rotation of the driven member, and a second speed setting for converting rotation from the power drive into a second speed rotation of the driven member, and
a switch that includes a first position, a second position and a third position, wherein in the first position the switch operates the second torque control means and selects the adjustment mode, in the second position the switch operates the first torque control means and selects the drive mode and the first speed setting, and in the third position the switch operates the first torque control means and selects the drive mode and the second speed setting.

In one form, in the first position the switch selects the first speed setting.

In another form, in the first position the switch selects the second speed setting.

The above aspect of the invention is advantageous in that it provides a power tool with a switch that is capable of selecting several different functions of the power tool, as described above, in a convenient and efficient manner. For example, the switch can adjust the power tool into at least three different modes. The first position of the switch provides a first mode for the power tool in which the second torque control means is operable and the adjustment mode and one of the first or the second speed settings are selected so that operation of the power drive facilitates gripping or release of the working element. The second position provides a second mode for the power tool in which the first torque control means is operable and the drive mode and first speed setting are selected so that operation of the power drive facilitates driving of the working element at a first speed of rotation. The third position provides a third mode for the power tool in which the first torque control means is operable and the drive mode and second speed setting are selected so that operation of the power drive facilitates driving of the working element at a second speed of rotation.

Thus, the switch facilitates adjustment of the driven member to grip or release a working element and to drive rotation of the working element at differing speeds of rotation relative to the speed of rotation of the power drive. Also, the above power tool arrangement does not require a user to adjust the torque setting of either of the torque control means to utilise differing torque settings in the drive mode and the adjustment mode because the switch enables operation of either one of the two torque control means each with their own torque setting in the drive mode and the adjustment mode respectively.

In one form, the power tool further includes an actuator member connecting the switch to the driven member, whereby movement of the switch between the first, second and third positions causes the actuator member to actuate the driven member between the adjustment mode and the drive mode.

In another form, the power tool further includes an adjustment means for adjusting the driven member between the drive mode and the adjustment mode. The adjustment means may include a first member having a first axis and a first engagement portion inclined relative to the first axis and a second member having a second axis and a second engagement portion inclined relative to the second axis. The first and second axes may extend in the same direction and the first and second engagement portions may engage and disengage each other by movement of the first and second members relative to each other in the direction of the axes. The engagement between the first and second engagement portions may result in the selection of the adjustment mode of the driven member and disengagement between the first and second engagement portions may result in the selection of the drive mode of the driven member.

In another form, the first member is a bevelled ring gear and the second member is a bevelled central gear and the first and second engagement portions thereof engage and disengage each other by movement of the central gear within a space defined within the ring gear.

In one form, the switch is a sliding switch which moves in a linear path.

In another form, the switch is a rotating switch which rotates about an axis.

In another form, the first torque control means is a clutch with a plurality of torque settings.

In yet another form, the second torque control means is a clutch with a single torque setting.

In yet another form, the second torque control means is a clutch with a plurality of torque settings.

In another form, the gearbox includes more than two speed settings wherein in each one of the speed settings the gearbox is operable for converting rotation from the power drive into a respective relative speed of rotation of the driven member.

In still yet another form, the switch includes a fourth position, wherein in the fourth position the switch operates the second torque control means and actuates the driven member to the adjustment mode and the gearbox to the second speed setting.

BRIEF DESCRIPTION OF THE FIGURES

The present invention will now be described in more detail with reference to the following Figures. The following Figures represent embodiments of the invention in the form of a hand held power drill and the drive train and mechanical driven member, or chuck, of a hand held power drill and for the sake of convenience the present invention is described below in detail with reference to the hand held power drill embodiment. It is to be appreciated, however, that the present invention may be suitable for use with various other forms of power tool such as, without limitation, hand held power saws, power screw-drivers, power percussion/hammer drills and any other power tool that utilises a driven member that releasably grips and drives movement of a working element relative to the power tool body.

FIG. 4 is an illustration of a side view of the drive train and driven member of FIG. 2 in the drive mode in which the first and second members of the means for adjusting the driven member between the modes are disengaged.

FIG. 5 is an illustration of a side cross section view of the drive train of FIG. 2 in the drive mode in which the first and second members are disengaged as shown in FIG. 4.

FIG. 6 is an illustration of a side view of the drive train of FIG. 2 in the adjustment mode in which the first and second members of the means for adjusting the driven member between the modes are engaged.

FIG. 7 is an illustration of a side cross section view of the drive train of FIG. 2 in the adjustment mode in which the first and second members are engaged as shown in FIG. 6.

FIG. 16 is an illustration of a side view of the drive train shown in FIG. 10 in the drive mode in which the first and second members are disengaged and in which the gearbox is in a second speed setting for converting rotation from the power drive into a second relative speed of rotation of the driven member and in which the other torque control means is engaged for controlling the amount of torque applied to the driven member by the power drive when in the drive mode.

FIG. 17 is an illustration of a cross section taken along the section line Z-Z shown in FIG. 16 in which the drive train is in the drive mode in which the switch ring is at a relative position of rotation about the axis of rotation of the driven member in which the torque control means for controlling the amount of torque applied to the driven member when in the adjustment mode is disengaged.

DETAILED DESCRIPTION

Figure 1:
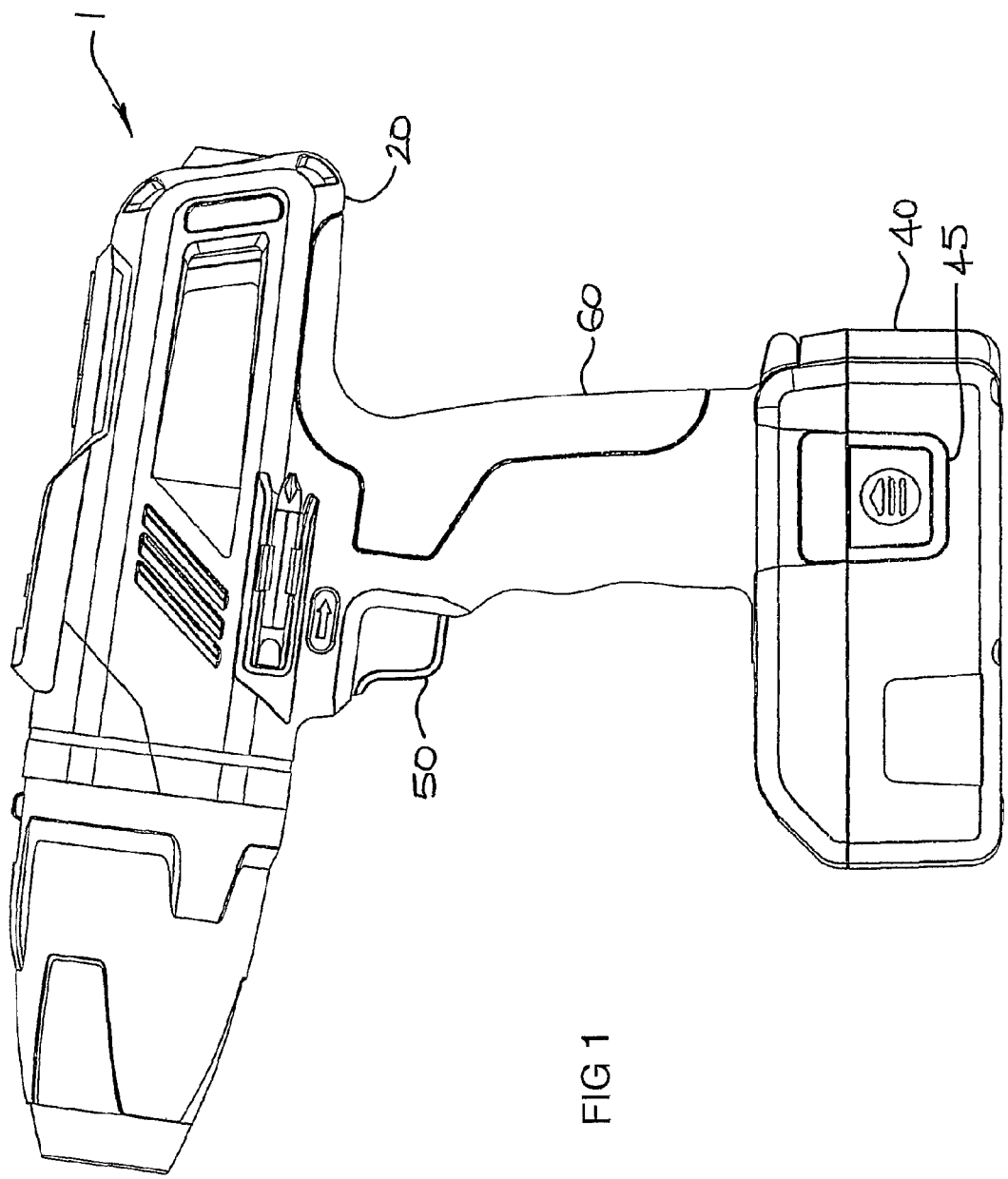
FIG. 1 illustrates in diagrammatic form a hand held power drill in accordance with a preferred embodiment of the invention that includes a power tool body and a driven member that is obscured by a guard extending from the front of the power tool body.
Figure 2:
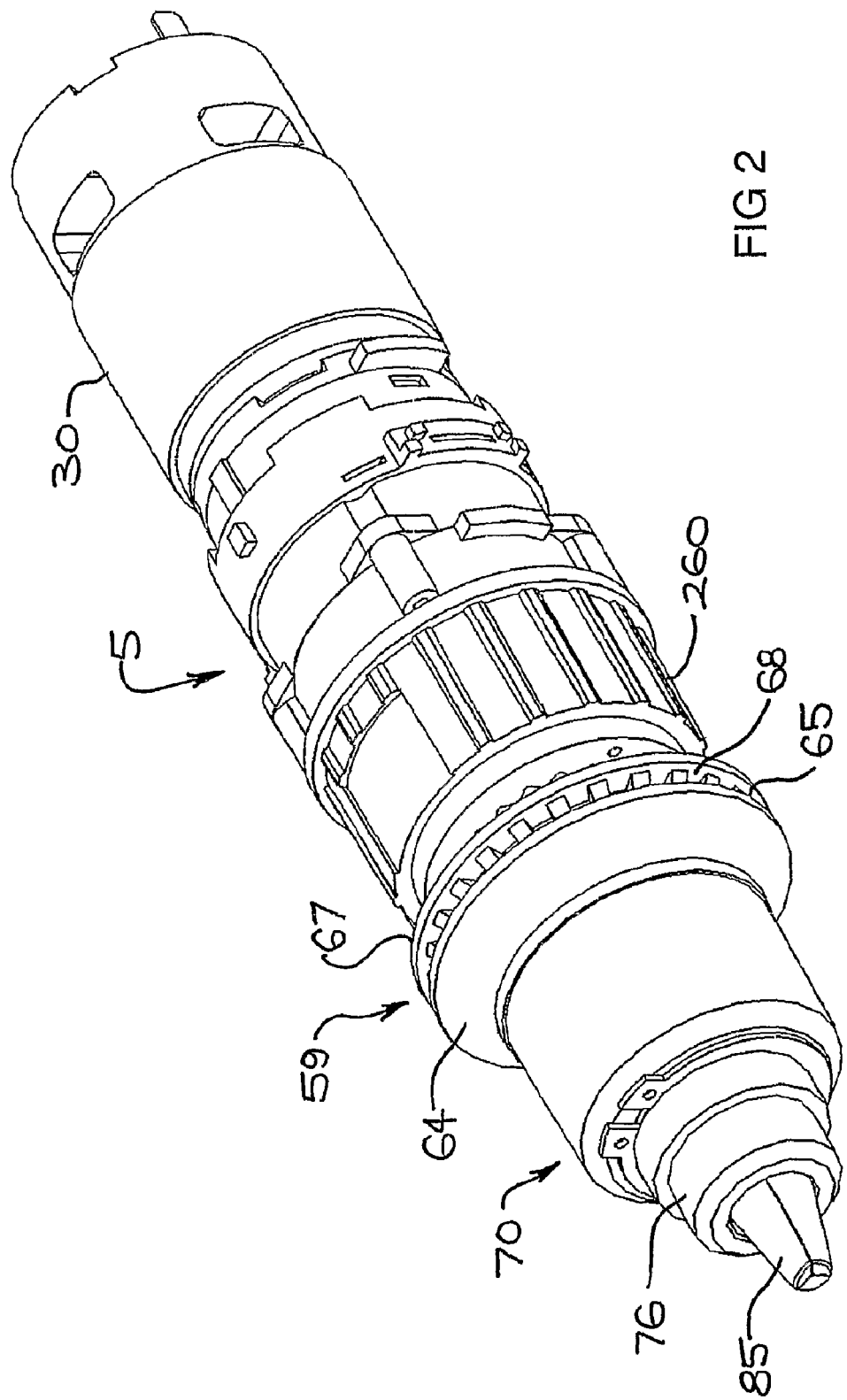
FIG. 2 is an illustration of a perspective view of some internal features of the power drill of FIG. 1 including a drive train that includes a driven member in the form of a chuck that is operable for releasably gripping a working element in an adjustment mode and driving the working element in a drive mode and that includes means for adjusting the driven member between the modes including a first member and a second member.
Figure 3:
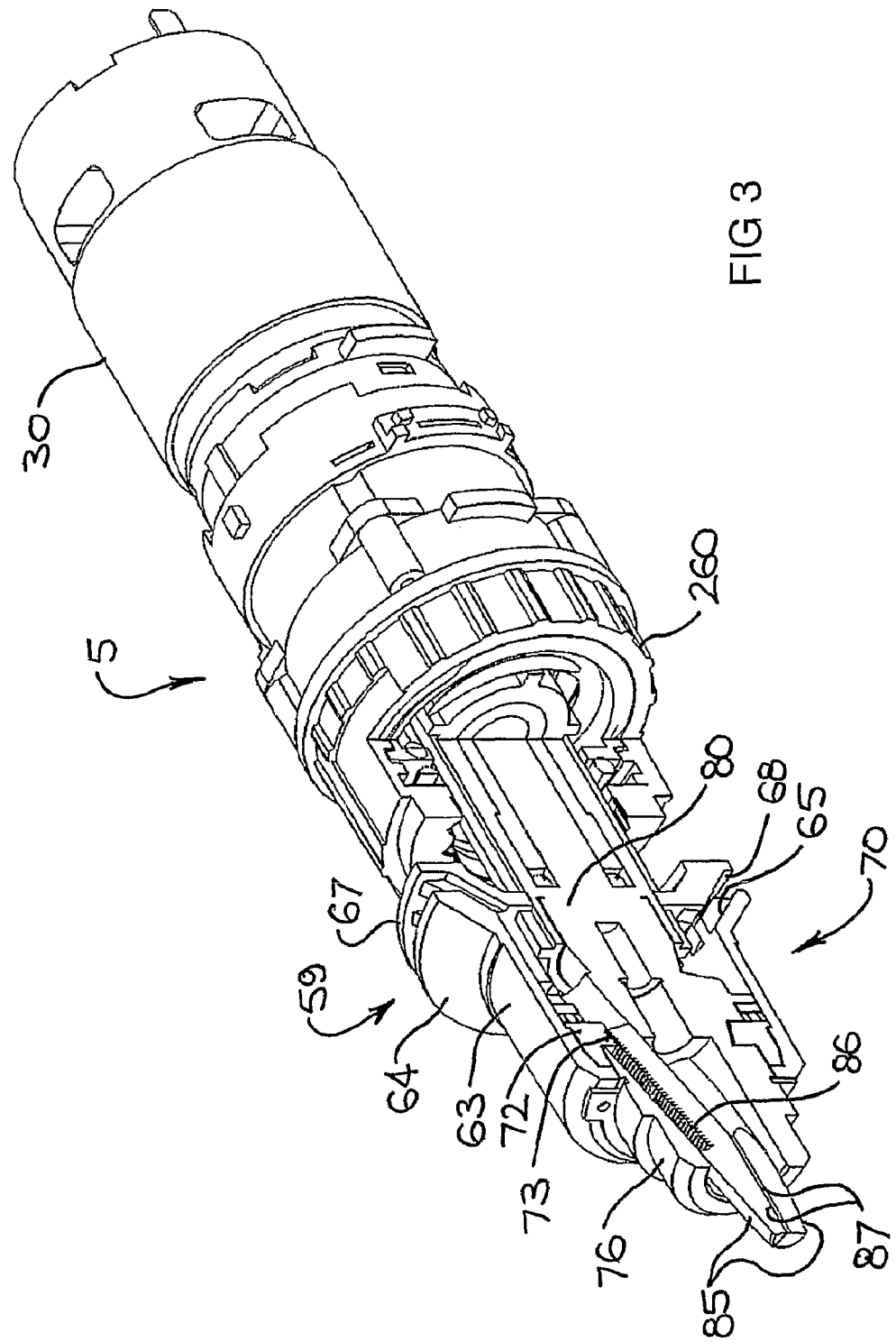
FIG. 3 is an illustration of a perspective view of the drive train shown in FIG. 2 with a section cut away to illustrate internal components of the drive train and the first and second members.

FIGS. 1 to 17 illustrate preferred embodiments of the invention in the form of a drive train 5 incorporated into a hand held power drill 1. However, the invention is applicable to other power tools that may or may not be hand held or portable. The power drill 1 includes a power drill body 20 integrally formed with a pistol grip handle 60 for gripping the power drill 1. While the arrangement of the handle 60 illustrated in the drawings is in the form of a pistol grip that is moulded to the shape of a user's hand, that is, the grip includes depressions to receive the fingers of a user, it is to be appreciated that other shapes and configurations of the handle 60 may be employed.

The body 20 of the power drill 1 has a generally cylindrical shape and encases components of the power drill 1 such as a motor 30. Incorporated into the handle 60 adjacent to the body 20 of the power drill 1 is a trigger 50 for actuating a switch (not shown) within the handle 60. Also incorporated into the handle 60 but distally from the body 20 of the power drill 1 are a battery 40 and a battery retaining and releasing means 45 that enables convenient replacement of the battery 40 as required. In another form, not illustrated, the power drill 1 may exclude the use of the battery 40 and may instead have a power lead extending from the handle 60, or any other suitable location, that connects to a mains power outlet to supply power to the power drill 1.

FIGS. 2 to 9 show one form of a drive train 5 for use in the drill 1 while FIGS. 10 to 17 show another form of the drive train 5. Common reference numerals are used to identify components with common functions in both forms of the drive train 5. The drive train 5 includes a power drive in the form of the motor 30 which may be electric, hydraulic, pneumatic internal combustion or any other form of powered motor. The drive train 5 also includes an adjustment mode torque control means 200, a gearbox 150, a drive mode torque control means 110 and a rotatable driven member 70 that is operable for releasably gripping a working element such as a drill bit (not shown). When a user operates the trigger 50, the switch is actuated to supply power from the battery 40 to the motor 30 to cause the motor 30 to drive rotation of components in the drive train 5 and ultimately the driven member 70.

Driven Member

In the particular arrangement shown, the driven member 70 is a three jaw chuck arrangement that includes a head portion 76 and a plurality of jaws 85 mounted to the head portion 76 in an angular orientation relative to an axis of rotation X of the driven member 70. Each jaw 85 has a gripping face 87 adapted to clamp against the shank of a working element such as a drill or screwdriver bit. Each jaw 85 is also slidably mounted in a respective recess 77 of the head portion 76 of the driven member 70. Each recess 77 is elongated and oriented at an angular displacement relative to the axis of rotation X of the driven member 70. Thus, each recess 77 provides for a path of movement of a jaw 85 relative to the head portion 76 and within the recess 77 that is angularly displaced relative to the axis of rotation X of the driven member 70. The driven member 70 includes an adjusting nut 72 which has a thread 73 that meshes with a thread 86 on each jaw 85. The head portion 76 is coupled to a drive shaft 80 which transmits rotation to the head portion 76 supplied by the motor 30 via the drive train 5. The arrangement of the adjusting nut 72, the jaws 85 and the head portion 76 are such that rotation of the head portion 76 due to rotation of the drive shaft 80 driven by the motor 30 causes the jaws 85 to rotate about the axis X.

In the drive mode of the driven member 70, shown in FIGS. 4, 5 and 14 to 17, the adjusting nut 72 is free to rotate about the axis X at the same rate as the head portion 76 and the jaws 85. Thus, when the driven member 70 is in the drive mode and the jaws 85 are clamped against the shank of a working element the motor 30 drives rotation of the working element.

In contrast, when the driven member 70 is in the adjustment mode, shown in FIGS. 6, 7 and 11 to 13, the arrangement of the adjusting nut 72, the jaws 85 and the head portion 76 are such that rotation of the drive shaft 80 driven by the motor 30 causes the jaws 85 to rotate about the axis X relative to the adjusting nut 72. This is because, in the adjustment mode, the adjusting nut 72 is prevented from rotating about the axis X at the same rate as the driven member 70 and the jaws 85, thus, resulting in relative rotation of the thread 73 of the adjusting nut 72 and the thread 86 of the jaws 85.

Relative rotation of the threads 73 and 86 causes the jaws 85 to move relative to the adjusting nut 72 within the recess 77 longitudinally and in an angular orientation relative to an axis of rotation X of the driven member 70. Rotation of the head portion 70 in one direction due to rotation driven by the motor 30 in one direction will cause the jaws 85 to converge which will result in their gripping faces 87 clamping the shank of a working element therebetween. Rotation of the head portion 76 in the opposite direction due to rotation driven by the motor 30 in the opposite direction will cause the jaws 85 to diverge so that a working element gripped by their respective gripping faces 87 is released or so that a gap is opened up between the gripping faces 87 into which a working element may be placed for gripping therebetween in the manner described above.

Mechanical Assembly

The drive and adjustment modes of the driven member 70 are provided by means of a mechanical assembly 59 including a first member 64 having an axis which is also an axis of rotation, which in the illustrated embodiment is in line with the axis X, and a second member 67 having an axis, which in the illustrated embodiment is also in line with the axis X. The first member 64 includes a first engagement portion 65 inclined relative to the axis X and the second member 67 includes a second engagement portion 68 that is also inclined relative to the axis X. In the illustrated embodiment, the first engagement portion 65 and the second engagement portion 68 are both substantially frustoconical and arranged to interengage and disengage upon relative movement of the first and second members 64, 67 in the direction of at least one of the axes of the first and second members 64, 67 which in the embodiments described herein are aligned with the axis X. Accordingly, the first engagement portion 65 and the second engagement portion 68 are both bevelled such that the first and second members 64, 67 respectively have the appearance of a bevelled ring gear and a bevelled central gear. The first member 64 is connected via a sleeve 63 to the adjusting nut 72. The second member 67 is connected to the body 250 in such a way that the second member 67 will not rotate about its axis or the axis X. However, the second member 67 is movable towards and away from the first member 64 in the direction of its axis and the axis X. Because the respective axes of the first and second members 64, 67 are in line with each other and the axis X the features of the first and second members 64, 67 are described herein with reference to the axis X. However, it is not necessary that the axes of the first and second members 64, 67 are in line with each other of the axis X so it is to be appreciated that wherever features of the first and second members 64, 67 are described herein with reference to the axis X such features could also be understood as being described with reference to one of respective axes of the first and second members 64, 67 which may not be in line with each other or with the axis X.

When the second member 67 is moved towards the first member 64 the second engagement portion 68 engages the first engagement portion 65 such that the first member 64, the sleeve 63 and the adjusting nut 72 are all prevented from rotating about the axis X. Accordingly, movement of the second member 67 towards the first member 64 in the direction of the axis X to provide inter-engagement between the second engagement portion 68 and the first engagement portion 65 corresponds to the adjustment mode of the driven member 70 wherein rotation of the head portion 76 due to rotation driven by the motor 30 causes the jaws 85 to converge or diverge in order to clamp or release the shank of a working element from between the gripping faces 87 of the jaws 85. Conversely, movement of the second member 67 away from the first member 64 in the direction of the axis X so as to disengage the second engagement portion 68 from the first engagement portion 65 corresponds to the drive mode of the driven member 70 wherein the adjusting nut 72 is free to rotate about the axis X at the same rate as the head portion 76 such that when the shank of a working element is clamped between the gripping faces 87 of the jaws 85 the motor 30 drives rotation of the jaws 85 and the working element gripped by the jaws 85.

Figure 8:
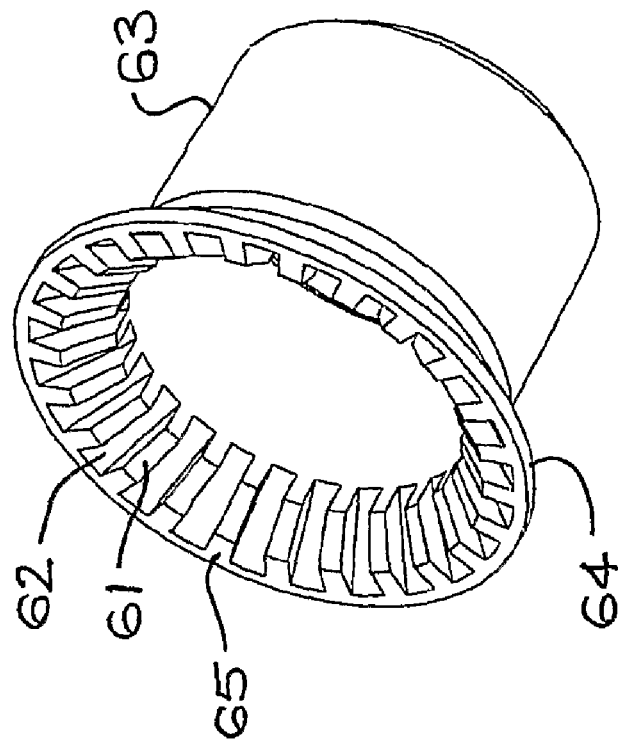
FIG. 8 is an illustration of a perspective view of the first member of the driven member of FIG. 2 showing the conical first engagement portion of the first member with elongated splines and elongated recesses.
Figure 9:
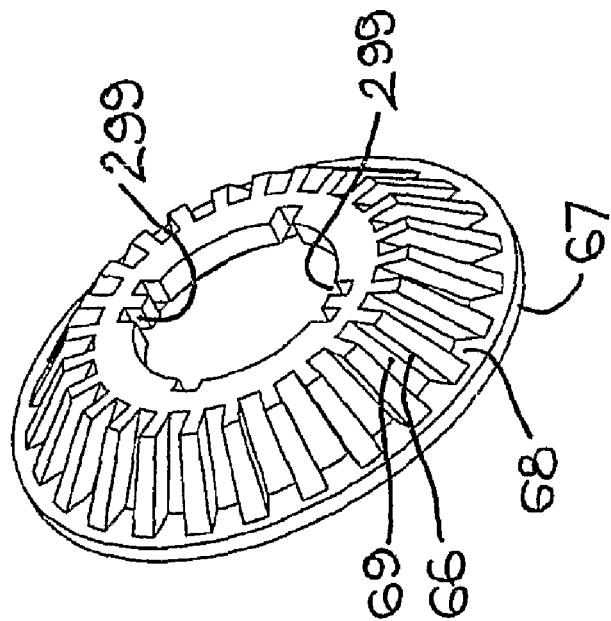
FIG. 9 is an illustration of a perspective view of the second member of the driven member of FIG. 2 showing the conical second engagement portion of the second member with elongated splines and elongated recesses for mating with the elongated splines and elongated recesses of the first engagement portion of the first member shown in FIGS. 2 to 8.

As can be particularly seen in FIGS. 8 and 9, the first engagement portion 65 is formed from a plurality of elongated splines 61 and elongated recesses 62 for inter-engagement with a plurality of elongated splines 66 and elongated recesses 69 that form the second engagement portion 68. The splines 61, 66 and recesses 62, 69 are elongated in a direction converging with the axis X. Thus, the splines 61, 66 and recesses 62, 69 are arranged in a frustoconical configuration. Accordingly, the first engagement portion 65 has an internal bevel gear configuration and the second engagement portion 68 has an external bevel gear configuration.

As can be particularly seen in FIGS. 2 to 7 and 10 to 12, in the case of the first member 64, the splines 61 and recesses 62 of the first engagement portion 65 are oriented inwardly towards the axis X. In contrast, in the second member 67 the splines 66 and recesses 69 of the second engagement portion 68 are oriented outwardly away from the axis X. Accordingly, the first and second members 64, 67 have engagement portions 65 and 68 of sufficient area and/or that include elongated splines 61, 66 and recesses 62, 69 that are of sufficient overall length to provide secure engagement between the engagement portions 65 and 68 of the first and second members 64 and 67 while also providing the advantage of reducing the length of the first engagement portion 65, the first member 64, the second engagement portion 68 and the second member 67 in the direction of the axes of either of the first or second members 64, 67 and/or the direction of the axis X.

In addition, the first engagement portion 65 can completely engage and disengage the second engagement portion 68 as a result of a relatively small amount of movement of the first member 64 relative to the second member 67 in the direction of the axis. X. The small amount of movement required for engagement and disengagement of the conical first and second engagement portions 65, 67 is in contrast with an arrangement in which, say, the first and second engagement portions 65, 67 were not conical but instead included axially extending splines 61, 66 and recesses 62, 69 aligned with the direction of the axis X such as would be the case if the first and second members 64, 87 were configured as cylindrical ring and central gears. Thus, in the arrangement illustrated in the Figures the second member 67 can move a distance in the direction of the axis X that is sufficient to engage and disengage the first and second engagement portions 65, 67 while remaining partially within an interior space defined within the first member 64. This contrasts with a cylindrical central gear and ring gear arrangement wherein for the gears to engage and disengage by relative movement in the axial direction the central gear must move entirely outside the space defined within the ring gear.

Accordingly, the arrangement of the first member 64 and the second member 67 in forms of the invention disclosed herein are advantageous in reducing the overall length of the mechanical assembly 59 in the direction of the axis X. As will be appreciated, this helps to reduce the overall length of the drive train 5 and, in turn, reduce the overall length of the drill 1 in the direction of the axis X.

Switch

As mentioned above, the second member 67 is capable of moving towards and away from the first member 64 along the axis X. Movement of the second member 67 in this way is facilitated by an actuator member 100 which is actuated by a sliding switch 90 which is slidably mounted to the body 20 of the drill 1 and which moves in a linear path. Although the switch 90 illustrated in the Figures is a sliding switch, the switch 90 may take the form of a rotating switch 90 which rotates about an axis. The actuator member 100 includes a resilient U-shaped member 104 coupled to an elongated actuator 102. The elongated actuator 102 is a rigid elongated member fixed at one end to the second member 67. The other end of the elongated actuator 102 includes a flange portion 101 having a U-shaped recess 103 for receiving the U-shaped member 104 therein. The first U-shaped member 104 includes a pair of pivot connections 105 which are configured to be pivotally attached to pins 259 projecting from a mounting 250 for the drive mode torque control means 110 which is stationary within the body 20 of the power drill 1. The pivot connections 105 are arranged between a web portion 98 and legs 107A of the U-shaped member 104. The legs 107A each terminate at a flange portion 108A which is received in an annular recess 109 extending around an outer surface 114 of a switching ring gear 111 of the drive mode torque control means 110.

Figure 11:
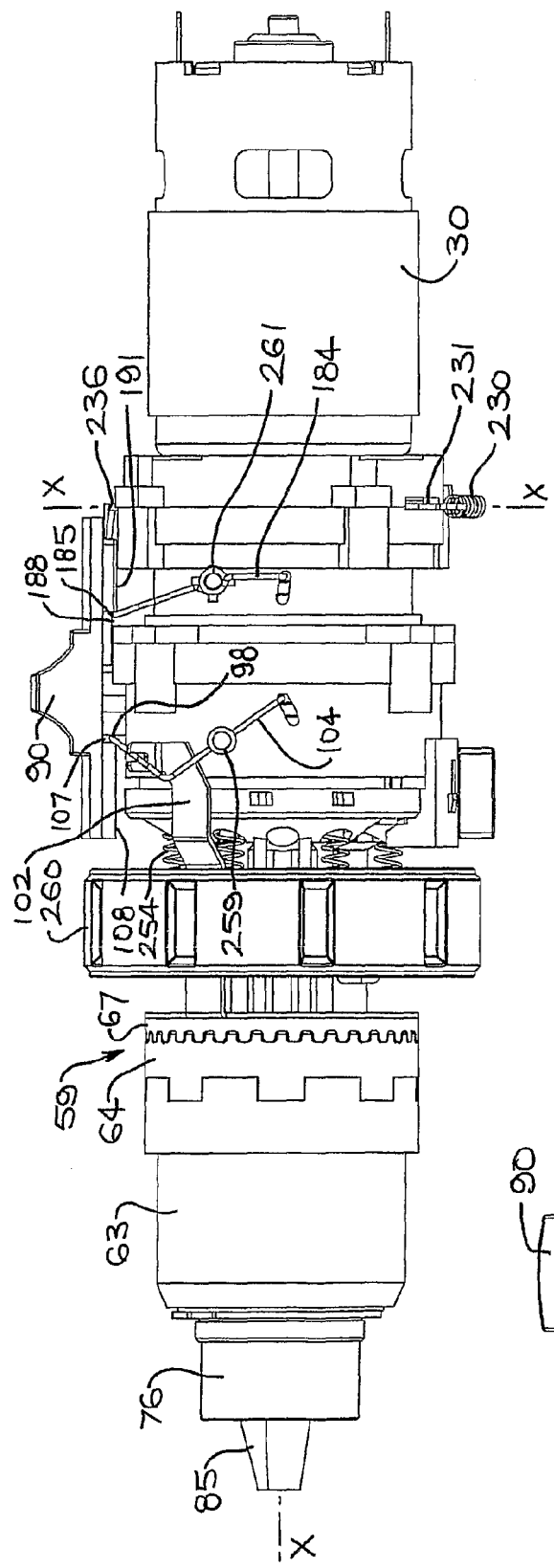
FIG. 11 is an illustration of a side view of the drive train shown in FIG. 10 in the adjustment mode in which the first and second members are engaged and the gearbox is in a first speed setting for converting rotation from the power drive into a first relative speed of rotation of the driven member and in which the adjustment mode torque control means is operable and the drive mode torque control means is not operable.
Figure 13:
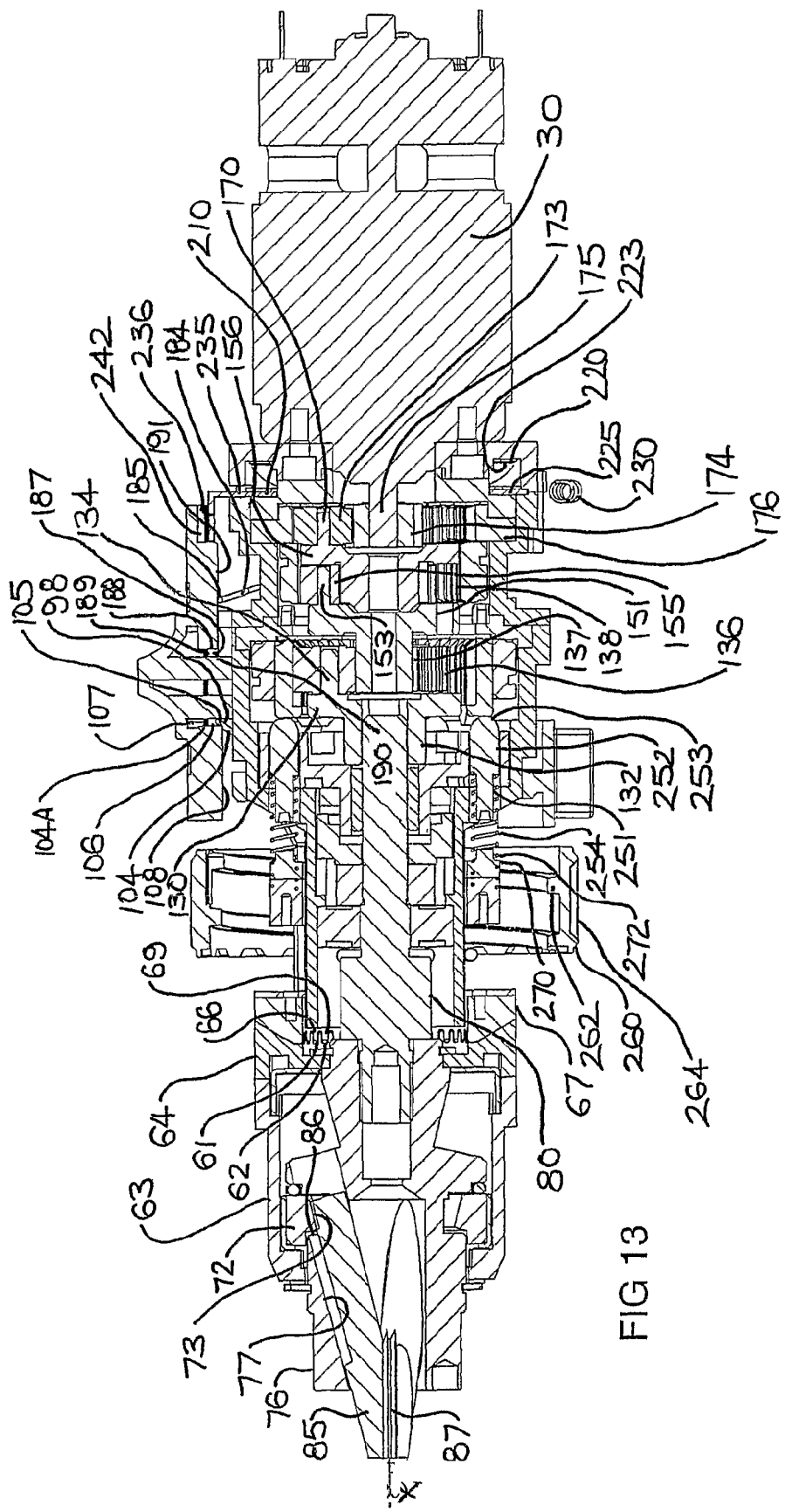
FIG. 13 is an illustration of a side cross section view of the drive train shown in FIG. 10 in the adjustment mode showing a switch ring and a biasing spring for engaging the torque control means for controlling the amount of torque applied to the driven member when in the adjustment mode wherein the switch ring is at a relative position of rotation about an axis of rotation of the driven member in which the torque control means is engaged and the gearbox is in the first speed setting.

As shown in FIGS. 11 and 13 the web portion 98 of the first U-shaped member 104 is received within a first biasing means receiving slot 104A of the switch 90. The first biasing means receiving slot 104A is a U-shaped slot having a web surface 107 connecting a first side surface 105 and a second side surface 106. The first and second side surfaces 105, 106 are parallel. The second side surface 106 extends from the web surface 107 to a flange surface 108 that extends transversely from the second side surface 106 in a plane that is horizontally intermediate the length of the first side surface 105. The flange surface 108 is configured to enable the web 98 of the first U-shaped member 104 to slide there-along when the switch 90 is slid in the direction of the axis X away from the driven member 70 and towards the motor 30. In contrast, when the switch 90 is slid towards the driven member 70 the web 98 of the first U-shaped member 104 slides along the flange surface 108 until it eventually reaches the first side surface 105 of the first biasing means receiving slot 104A. At this point, the first side 105 abuts against the web 98 and continued movement of the switch 90 towards the driven member TO urges the web 98 towards the driven member 70. The first U-shaped member 104 pivots about the pivot connections 105 such that the web 98 moves into the first biasing means receiving slot 104A towards the web surface 107 thereof. Accordingly, the configuration of the first biasing means receiving slot 104A is such that it picks up and drops off the web 98 of the first U-shaped member 104 as the switch 90 is moved towards the driven member 70 and away from the driven member 70 respectively.

When the switch 90 is slidably moved towards the driven member 70 the legs 107A of the U-shaped member 104 pivot about the pivot connections 105 and move away from the driven member 70. Because the legs 107A have their flanges 108A located in the recess 109 of the switching ring gear 111, movement of the legs 107A away from the driven member 70 causes the switching ring gear 111 to also move away from the driven member 70. The switching ring gear 111 includes a plurality of inwardly projecting splines 112 on an inner surface 113 of the switching ring gear 111. An outer surface 114 of the switching ring gear 111 includes a plurality of spaced apart lugs 115. The drive mode torque control means 110 also includes a switchable ring gear 116 that is switchable by the switching ring gear 111. The switchable ring gear 116 includes an inner surface 117 having a plurality of inwardly projecting splines 118 and an outer surface 119 having a plurality of outwardly projecting splines 120. As is set out below, the inwardly projecting splines 112 on the switching ring gear 111 are selectively engageable with the outwardly projecting splines 120 of the switchable ring gear 116 by movement of the switching ring gear towards or away from the driven member along the axis X. The switchable ring gear 116 also includes an annular surface 121 extending between the inner surface 117 and the outer surface 119. The annular surface 121 includes a plurality of spaced apart castellations 122. Each castellation 122 includes a pair of inclined surfaces 123, 124 that are inclined relative to the annular surface 121.

In the manner described herein, movement of the switching ring gear 111 towards or away from the driven member along the axis X as a result of movement of the switch 90 is operable for disengaging the drive mode torque control means 110 when the driven member 70 is in the adjustment mode, as shown in FIGS. 6, 7 and 11 to 13, and engaging the drive mode torque control means 110 when the driven member 70 is in the drive mode, as shown in FIGS. 4, 5 and 14 to 17.

Engagement of the Drive Mode Torque Control Means

Figure 10:
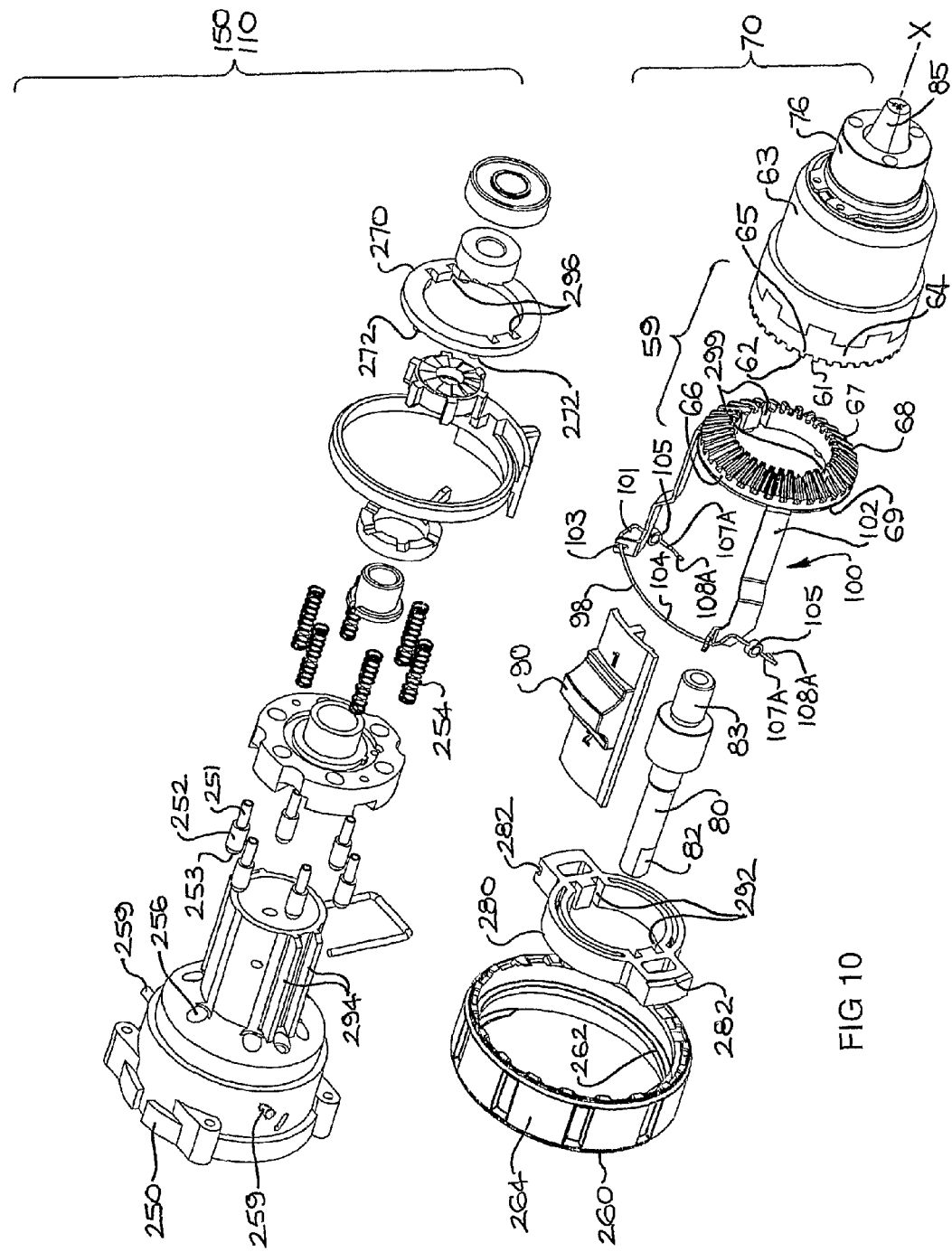
FIG. 10 is an illustration of an exploded view of another form of drive train including a driven member in the form of a chuck that is operable for releasably gripping a working element in an adjustment mode and driving the working element in a drive mode and that includes means for adjusting the driven member between the modes including: a first member and a second member, a torque control means for controlling the amount of torque applied to the driven member when in the adjustment mode; another torque control means for controlling the amount of torque applied to the driven member by the power drive when in the drive mode and a high and low speed gearbox.
Figure 10:
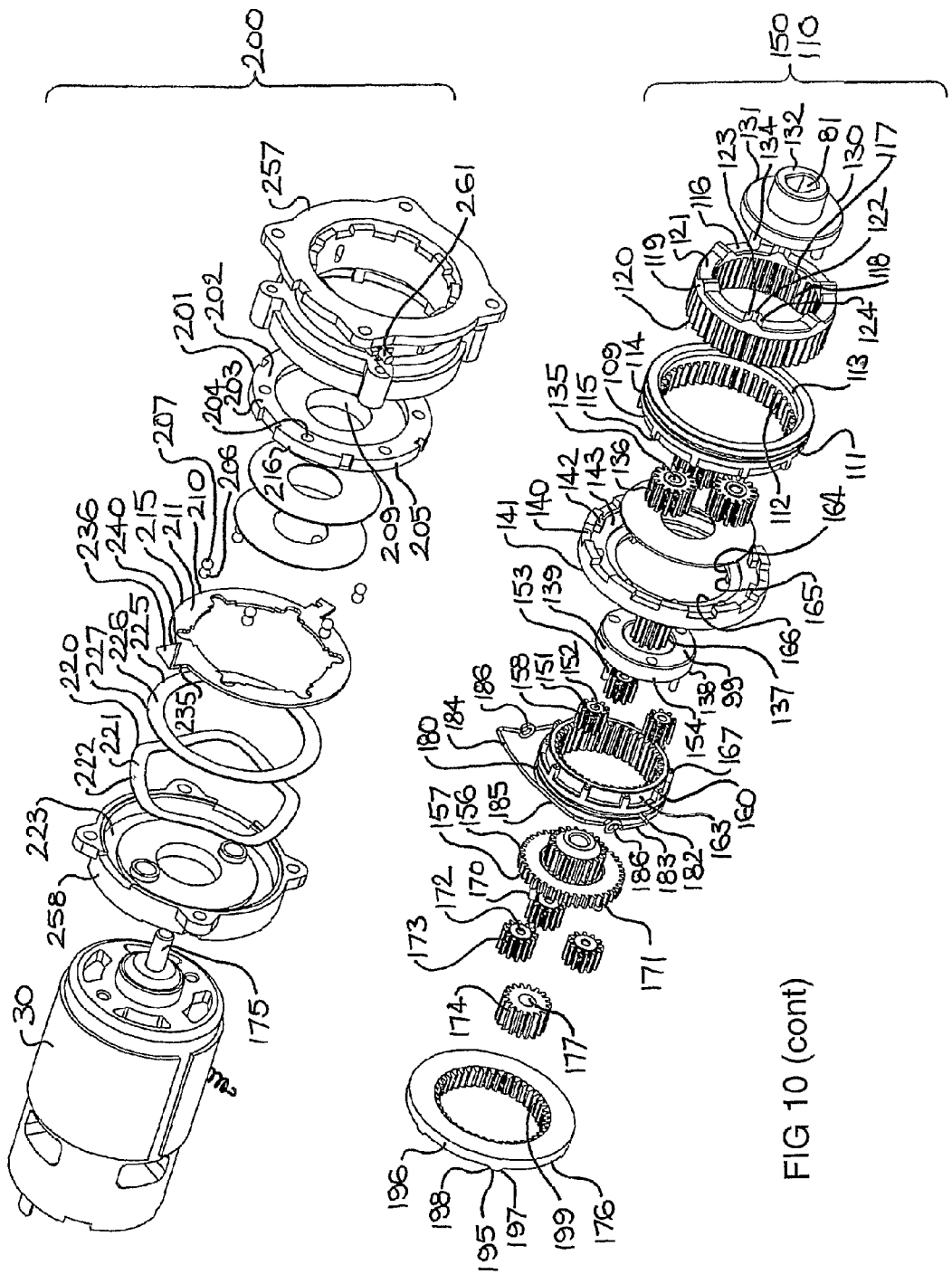

Referring to FIG. 10, the drive mode torque control means 110 includes, in addition to the switching ring gear 111, the switchable ring gear 116 and the mounting 250, a plurality of engagement pins 252 and springs 254 that fit within apertures 256 within the mounting 250, an adjustment ring 260, a spring engaging ring 270 and a threaded ring 280. The threaded ring 280 has an external helical thread 282 that threadably engages an internal helical thread 262 of the adjustment ring 260. The adjustment ring 260 is mounted to the body 20 of the drill 1 in such a way as to enable the adjustment ring 260 to rotate about the axis X but not be moveable in the direction of the axis X. In contrast, the threaded ring 280 includes slots 292 that slidably receive ridges 294 extending along lateral sides of the mounting 250 in a manner such that the threaded ring 280 can move in the direction of the axis X but cannot rotate about the axis X.

The adjustment ring 260 has an external gripping surface 264 that can be gripped by a user to rotate the adjustment ring 260 to thereby cause the threadably engaged threaded ring 280 to move in the direction of the axis X either towards or away from the driven member 70 depending on the direction in which the adjustment ring 260 is rotated about the axis X. The spring engaging ring 270 has a plurality of projections 272 for engaging one end of the springs 254. The other end of each spring 254 engages a spring engaging portion 251 at one end of each pin 252. The other end of each pin 252 has a rounded surface 253 for engaging the annular surface 121 and castellations 122 of the switchable ring gear 116. The spring engaging ring 270 also has slots 296 that slidably receive the ridges 294 of the mounting 250 in a manner such that the spring engaging ring 270 can move in the direction of the axis X but cannot rotate about the axis X. The spring engaging ring 270 is also located between the threaded ring 280 and the springs 254 such that movement of the threaded ring 280 in the direction of the axis X towards or away from the driven member 70 due to rotation of the adjustment ring 260 causes, in the manner described above, the spring engaging ring 270 to also move towards or away from the driven member 70 and away from or towards the switchable ring gear 116 respectively. The springs 254 are also respectively either compressed or relaxed such that the amount of pressure applied to the pins 252 which is then applied by the rounded surfaces 253 of the pins 252 against the annular surface 121 and castellations 122 of the switchable ring gear 116 is varied by rotation of the adjustment ring 260.

By varying the pressure applied by the rounded surfaces 253 of the pins 252 against the annular surface 121 and castellations 122 of the switchable ring gear 116 in the manner described herein the amount of torque that can be transmitted to the driven member 70 from the motor 30 when the driven member 70 is in the drive mode can be adjusted by the drive mode torque control means 110. This is because when the amount of torque from the motor 30 reaches a threshold level the inclined surfaces 123, 124 of the switchable ring gear 116 engage the rounded surfaces 253 of the pins 252 with such force that the biasing force of the springs 254 against the pins 252 is overcome and the pins 252 are moved towards the driven member 70 and the rounded surfaces 253 move over the castellations 122 of the switchable ring gear 116. As a result, the switchable ring gear 116 begins to rotate about the axis X thus changing from a stationary ring gear to a rotating ring gear, which as described below, prevents the transmission of rotation from the motor 30 to the drive shaft 80 and onto the driven member 70. As mentioned herein, the drive shaft 80 transmits rotation supplied by the motor 30 to, the head portion 76 of the driven member 70. The arrangement of the adjusting nut 72, the jaws 85 and the head portion 76 are such that rotation of the head portion 76 due to rotation of the drive shaft 80 driven by the motor 30 causes the jaws 85 to rotate about the axis X. Thus, the drive mode torque control means 110 controls the amount of torque applied by the motor 30 via the drive shaft 80 to the driven member 70 and the amount of torque applied can be adjusted. In other words, the drive mode torque control means 110 operates by clutching the drive shaft 80 which rotates the driven member 70.

The adjustment ring 260 and the threaded ring 280 are configured to provide for movement of the threaded ring 280 towards or away from the driven member 70 in increments. Each increment of movement of the threaded ring 280 towards or away from the driven member 70 corresponds to a discreet torque setting for the drive mode torque control means 110. Each torque setting corresponds to a different amount of torque applied by the motor 30 to the driven member 70 and the working element when the driven member 70 is in the drive mode.

Disengagement of the Drive Mode Torque Control Means

The switching gear 111 and the switchable ring gear 116 are configured to inter-engage such that the splines 112 on the inner surface 113 of the switching gear 111 engage with the splines 120 on the outer surface 119 of the switchable gear 116. The drive mode torque control means 110 further includes a first spindle member 130. The first spindle member 130 includes a disc portion 131 and a boss 132 projecting from one side of the disc 131. The other side of the disc 131 includes three spindles 134 projecting therefrom. The three spindles 134 are configured to be inserted within a respective aperture 135 of one of three planet gears 136. The three planet gears 136 mesh with a sun gear 137 that is fixedly attached to a first side 99 of a disc 139 of a second spindle member 138. The planet gears 136 mesh with the splines 118 on the inner surface 117 of the switchable ring gear 116 such that rotation of the sun gear 137 resulting from rotation of the second spindle member 138 causes rotation of each of the planet gears 136 in the opposite direction.

Figure 12:
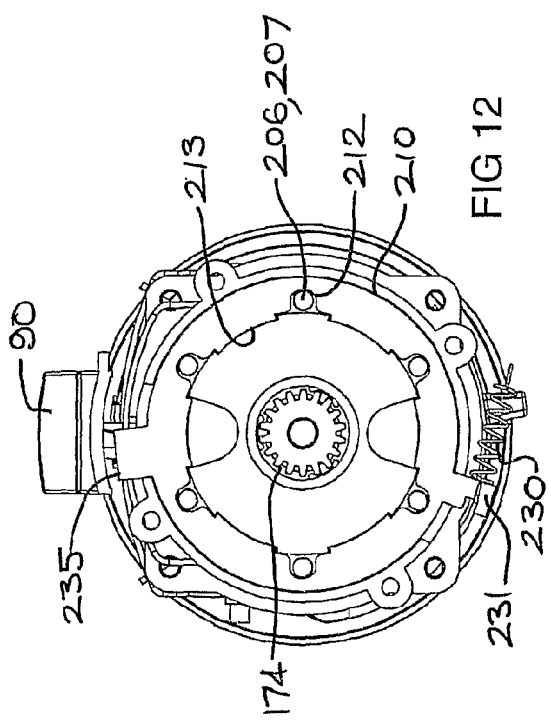
FIG. 12 is an illustration of cross section view taken along the section line X-X shown in FIG. 11 in which the drive train is in the adjustment mode in which the first and second members are engaged and the gearbox is in the first speed setting and in which the adjustment mode torque control means is operable.

When, as illustrated in FIGS. 11 to 13, the switch 90 is slidably moved towards the driven member 70 and away from the motor 30 such that the switching ring gear 111 is in a position away from the driven member 70 the lugs 115 of the switching ring gear 111 are received within respective slots 140 of a locking ring 141. When the switch 90 is slidably moved away from the driven member 70 and towards to the motor 30, as illustrated in FIGS. 14 to 17, such that the switching ring gear 111 is in a position towards the driven member 70 the lugs 115 of the switching ring gear 111 are not received within the respective slots 140 of the locking ring 141.

The locking ring 141 is sandwiched between the mounting 250 and a second housing portion 257 and is thereby fixed relative to the body 20 of the drill 1 such that the locking ring 141 cannot rotate about the axis X. The slots 140 are separated by ridges 142 on a first side 143 of the locking ring 141. The slots 140 and ridges 142 are arranged in an annular configuration on the first side 143 and are oriented towards the driven member 70. As mentioned above, the lugs 115 of the switching ring gear 111 are configured to be received in the slots 140 of the locking ring 141 when the switching ring gear 111 is moved away from the driven member 70 as a result of movement of the switch 90 towards the driven member 70. In this position, the lugs 115 of the switching ring gear 111 engage the ridges 142 of the locking ring 141 such that the switching ring gear 111 is prevented from rotating about the axis X by the fixed locking ring 141. Thus, in this position the switching ring gear 111 acts as a stationary ring gear and meshes with the switchable ring gear 116, as described above, to prevent rotation of the switchable ring gear 116 and consequently cause the switchable ring gear 116 to also act as a stationary ring gear. In this position, which corresponds to a first position of the switch 90, rotation of the sun gear 137 about the axis X causes rotation of the planet gears 136 about the axis X which in turn causes rotation of the first spindle member 130 about the axis X. The boss 132 of the first spindle member 130 has a slot 81 which receives a complementary shaped first end 82 of the drive shaft 80. A second end 83 of the drive shaft 80 opposite the first end 82 is connected to the head portion 76 of the driven member 70.

Accordingly, when the switching ring gear 111 is moved away from the driven member 70 the lugs 115 of the switching ring gear 111 are configured to be received in the slots 140 of the locking ring gear 141 such that the switching ring gear 111 is prevented from rotating about the axis X. Thus, in this position the switching ring gear 111 acts as a stationary ring gear and meshes with the switchable ring gear 116 to cause the switchable ring gear 116 to also act as a stationary ring gear. Operation of the motor 30 causes, as will be described below, rotation of the sun gear 137 about the axis X, which because the switchable ring gear 116 is stationary, causes rotation of the planet gears 136 about the axis X which in turn causes rotation of the first spindle member 130 and the boss 132 thereof about the axis X. Because the drive shaft 80 is connected to the boss 132 and the head portion 76 of the driven member 70, the drive shaft 80 and the head portion 76 of the driven member 70 are also caused to rotate about the axis X.

Thus, as described above and illustrated in FIGS. 11 to 13, when the switch 90 is in the first position the drive mode torque control means 110 is disengaged or locked out. As such, rotation of the second spindle member 138, and the sun gear 137 attached thereto, driven by the motor 30 is converted to rotation of the drive shaft 80 and in turn the head portion 76 of the driven member 70. When the drive mode torque control means 110 is disengaged or locked out it is unable to affect the transmission of rotation from the motor 30 to the driven member 70.

Movement of the switch 90 into the first position also causes the first biasing means receiving slot 104A of the switch 90 to engage the web 98 of the first U-shaped member 104 and to pivot the first U-shaped member 104 about the pivot connections 105. Thus, movement of the switch 90 into the first position also causes movement of the web 98, the actuator 102 coupled via the recess 103 to the web 98, and the second member 67 all to move towards the first member 64 such that the first engagement portion 65 of the first member 64 and the second engagement portion 68 of the second member 67 inter-engage.

The second member 67 includes grooves 299 that slidably receive the ridges 294 on the lateral sides of the mounting 250 in such a manner that the second member 67 may not rotate about the axis X. As illustrated in FIGS. 11 to 13, when the switch 90 is in the first position the first member 64 and the second member 67 are in engagement with each other and the drive mode torque control means 110 is disengaged so that rotation of the second spindle member 138, and the sun gear 137 attached thereto, driven by the motor 30 causes rotation of the drive shaft 80, the head portion 78 and the jaws 85 relative to the adjusting nut 72 which is fixedly coupled to the non-rotatable first member 64. This configuration corresponds to the adjustment mode of the driven member 70 whereby the jaws 85 move in response to operation of the motor 30 in an angular path relative to the axis X to grip or release the shank of a working element between the gripping faces 87 of the jaws 85.

When the switch 90 is in the first position the first U-shaped member 104 urges the first and second members 64 and 67 into engagement in a manner that ameliorates crashing of the first and second members 64 and 67. If the splines 61 of the first member 64 meet directly with the splines 66 of the second member 67 and not directly with the recesses 62 and 69 of the other one of the first and second members 64, 67 then the U-shaped member 104, which is formed out of a resiliently flexible material, is operable to urge the first and second members 64, 67 into engagement until, as a result of some relative rotation of the first and second members 64, 67, the splines 61, 66 and recesses 62, 69 line up and engage each other.

Gearbox

The gearbox 150 transmits rotation to the second spindle member 138 and the driven member 70 from the motor 30 in the manner described below. Also, the transmission of rotation from the motor 30 to the second spindle member 138 and the driven member 70 is affected by the adjustment mode torque control means 200 as described below.

The gearbox 150 of the embodiment illustrated in the Figures is a two speed gearbox. The two speeds are provided by gear reduction mechanisms involving a first and a second reduction in the rate of rotation of the second spindle member 138, the first spindle member 130, the drive shaft 80 and the driven member 70 relative to the motor 30. The gearbox 150 includes three low speed planet gears 151 that each include a recess 152 for receiving a spindle 153 projecting from a second side 154 of the second spindle member 138. The planet gears 151 mesh with a low speed sun gear 155 that is fixedly attached to a first side 159 of a spindle gear 156 that includes radially outwardly projecting splines 157. For a purpose that will become apparent below, the radially outwardly projecting splines 157 of the spindle gear 156 project the same distance radially outwardly from the axis X as radially outwardly extending splines 158 of each of the low speed planet gears 151. The gearbox 150 includes a gearbox switching ring gear 160 which is operable for switching the gearbox 150 between low and high speed settings.

The gearbox switching ring gear 160 includes a plurality of splines 181 that project inwardly from an inner radial surface 162 to mesh with the splines 158 of the low speed planet gears 151 and the splines 157 of the spindle gear 156. The inwardly projecting splines 161 of the gearbox switching ring gear 160 can simultaneously mesh with the splines 158 of the low speed planet gears 151 and the splines 157 of the spindle gear 156 or can mesh with only the splines 158 of the low speed planet gears 151 depending on whether the gearbox switching ring gear 160 is respectively in a position away or towards the driven member 70 in the direction of the axis X. The inwardly projecting splines 161 of the gearbox switching ring gear 160 simultaneously mesh with the splines 158 of the low speed planet gears 151 and the splines 157 of the spindle gear 156 when the gearbox switching ring gear 160 is in the position away from the driven member 70 in the direction of the axis X. The gearbox switching ring gear 160 is movable from the position away from the driven member 70 to a position towards the driven member 70 in the direction of the axis X such that the inwardly projecting splines 161 on the inner surface 162 of the gearbox switching ring gear 160 no longer mesh with the splines 157 of the spindle gear 156 but only mesh with the splines 158 of the low speed planet gears 151.

The gearbox switching ring gear 160 has a plurality of lugs 167 on an outer peripheral surface 163 thereof. Each lug 167 is receivable within a respective slot 164 on a second side 166 of the locking ring 141 when the gearbox switching ring gear 160 is in the position towards the driven member 70. Thus, when the gearbox switching ring gear 160 is in the position towards the driven member 70 it moves into locking engagement with the stationary locking ring 141. The slots 164 of the locking ring 141 are separated by ridges 165 and are arranged in an annular configuration on the second side 166 oriented in a direction away from the driven member 70 and towards the gearbox switching ring gear 160. Thus, when the gearbox switching ring gear 160 is moved towards the locking ring 141 the lugs 167 are received in the slots 164 and abut against the ridges 165 to prevent rotation of the gearbox switching ring gear 160 around the axis X. When rotation of the gearbox switching ring gear 160 around the axis X is prevented by the locking ring 141 the gearbox switching ring gear 160 becomes a stationary ring gear. When the gearbox switching ring gear 160 becomes a stationary ring gear rotation of the spindle gear 156 and the attached low speed sun gear 155 about the axis X causes rotation of the low speed planet gears 151 about the axis X. The rotation of the low speed planet gears 151 about the axis X causes rotation of the second spindle member 138 about the axis X, however, at a reduced rate of rotation relative to the rate of rotation of the spindle gear 156. Accordingly, the location of the gearbox switching ring gear 160 in a direction towards the driven member 70 and in engagement with the locking ring 141 corresponds to a low speed setting of the gearbox 150. Thus, the reduction in the rate of rotation from the spindle gear 157 to the second spindle member 138 is the second rate of rotation reduction caused by the gearbox 150.

The first rate of rotation reduction caused by the gearbox 150 is facilitated by the spindle gear 156, a plurality of high speed planet gears 173 and a high speed sun gear 174 connected to an armature 175 projecting from the motor 30. Three spindles 170 that project from a second side 171 of the spindle gear 156 are received within apertures 172 within each of the high speed planet gears 173. The high speed planet gears 173 mesh with the high speed sun gear 174 which has an aperture 177 which receives and is fixedly attached to the rotatable armature 175 projecting from the motor 30. The high speed planet gears 173 also mesh with a high speed gear ring gear 176 and in particular with radially inwardly projecting splines 199 of the high speed gear ring gear 176. The high speed gear ring gear 176 can be selectively maintained in a stationary position whereby it does not rotate about the axis X. When the high speed gear ring gear 176 is maintained stationary, and rotation of the armature 175 caused by activation of the motor 30 causes rotation of the sun gear 174 about the axis X, the high speed planet gears 173, which mesh with the high speed sun gear 174 and the high speed gear ring gear 176, rotate about the axis X which in turn causes rotation of the spindle gear 156 about the axis X. As long as the high speed gear ring gear 176 is maintained stationary then rotation of the armature 175 will transmit into rotation of the spindle gear 156 at a lower relative speed to the speed of rotation of the armature 175 of the motor 30. This corresponds to the first rate of rotation reduction caused by the gearbox 150.

Thus, the position of the gearbox switching ring gear 160 towards the driven member 70, as illustrated in FIGS. 16 and 17, and in engagement with the locking ring 141 corresponds to the low speed setting of the gearbox 150. Movement of the gearbox switching ring gear 160 to the position away from the driven member 70, as illustrated in FIGS. 11 to 15, and out of engagement with the locking ring 141 and into meshing engagement with the spindle gear 156 and the low speed planet gears 151 corresponds to the high speed setting of the gearbox 150.

In the high speed setting of the gearbox 150 rotation of the spindle gear 156 and the low speed planet gears 151 results in rotation of the gearbox switching ring gear 160 about the axis X at the same rate as the rate of rotation of the spindle gear 156 and the low speed planet gears 151 about the axis X. Thus, the rate of rotation of the second spindle member 138 is the same as the rate of rotation of the spindle gear 156. As the rate of rotation of the spindle gear 156 is only one step down from the rate of rotation of the armature 175 of the motor 30 the rate of rotation of the second spindle member 138 is also only one step down from the rate of rotation of the armature 175 of the motor 30. In the high speed setting, the gearbox 150 provides for a rate of rotation of the driven member 70 relative to the rate of rotation of the armature 175 of the motor 30 that is higher than in the low speed setting of the gearbox 150.

The gearbox switching ring gear 160 includes an annular recess 180 on the outer surface 163 for receiving flanges 182 at the ends of legs. 183 of a second U-shaped biasing means 184. The legs 183 are connected by a web 185. Pivot connections 186 are included on the legs 183 between the flanges 182 and the web 185. To facilitate movement of the gearbox switching ring gear 160 towards and away from the driven member 70 corresponding to the respective low and high speed settings of the gearbox 150. The pivot connections 186 are pivotally attached to pins 261 protruding laterally from the second housing portion 257 such that movement of the web 185 in the direction of the axis X in one direction causes movement of the flanges 182 at the ends of the legs 183 in the opposite direction as well as the gearbox switching ring gear 160. The web 185 is configured to be received within a second biasing means receiving slot 187 on the switch 90. The second biasing means receiving slot 187 is similar in configuration to the first biasing means receiving slot 104A and includes a web surface 188 extending between a first side surface 189 and a second side surface 190. The second side surface 190 extends from the web surface 188 to a second flange surface 191 which extends transversely from the second side surface 190 in a plane that is horizontally intermediate the length of the first side surface 189.

Figure 14:
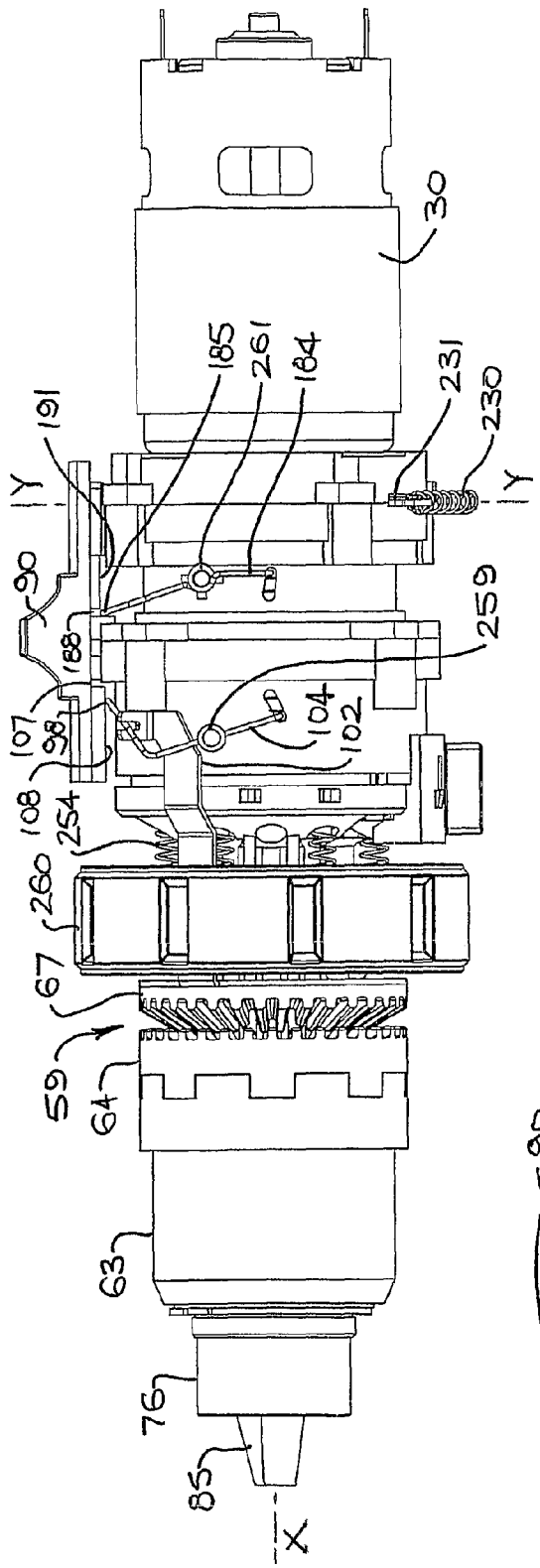
FIG. 14 is an illustration of a side view of the drive train shown in FIG. 10 in the drive mode in which the first and second members are disengaged and the gearbox is in the first speed setting and in which another torque control means is engaged for controlling the amount of torque applied to the driven member by the power drive when in the drive mode.
Figure 15:
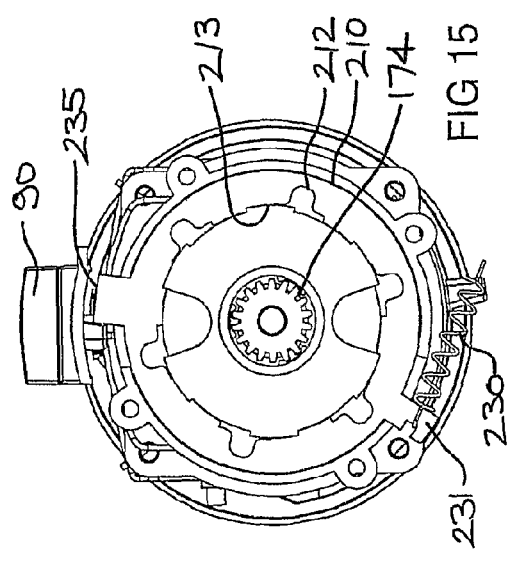
FIG. 15 is an illustration of a cross section view taken along the section line Y-Y shown in FIG. 14 in which the drive train is in the drive mode in which the switch ring is at a relative position of rotation about the axis of rotation of the driven member in which the torque control means for controlling the amount of torque applied to the driven member when in the adjustment mode is disengaged.

As illustrated in FIGS. 11 to 13, when the switch 90 is in the first position closest towards the driven member 70 the web 185 of the second biasing means 184 abuts against the second flange surface 191. As illustrated in FIGS. 14 and 15, movement of the switch 90 away from the driven member 70 and away from the first position causes the web 185 to slide along the flange surface 191 until it reaches the second biasing means receiving slot 187. The position of the switch 90 illustrated in FIGS. 14 and 15 corresponds to the second position of the switch 90. In the second position the switch 90 selects the high speed of the gearbox 150 and the web 185 is picked up by the second biasing means receiving slot 187. When the web 185 is picked up by the second biasing means receiving slot 187 it can be moved in the direction of the axis X away from the driven member 70 as illustrated in FIGS. 16 and 17 which causes the flanges 182 to pivot about the pivot connection 186 and in turn the gearbox switching ring gear 160 to move from the high speed gear position to the low speed gear position in engagement with the locking ring 141. Accordingly, when the switch 90 is in the position illustrated in FIGS. 16 and 17, which corresponds to the third position thereof, the switch 90 selects the low speed gear of the gearbox 150.

Adjustment Mode Torque Control Means

Situated in the drive train 5 between the gearbox 150 and the motor 30 is the adjustment mode torque control means 200 which is contained within a first housing portion 258 and the second housing portion 257. The adjustment mode torque control means 200 includes the high speed gear ring gear 176, a stationary member 201, an adjustment mode switch ring 210, a flat washer 225 and a wave washer 220. The high speed gear ring gear 176 has a plurality of castellations 195 projecting from an annular surface 198 of the high speed gear ring gear 176 that is oriented towards the motor 30. The castellations 195 also project from the annular surface 196 axially in the direction of the axis X towards the motor 30. Each castellation 195 includes a pair of inclined surfaces 197, 198 that are inclined relative to the annular surface 196. The annular surface 196 and the castellations 195 face towards a first side 202 of the stationary member 201. The first side 202 includes an annular surface 203 which includes a plurality of apertures 204 that extend from the annular surface 203 on the first side 202 to an annular surface 209 on an opposite second side 205. A pair of ball bearings 206, 207 are received within each aperture 204. One of the ball bearings 206 of each pair will engage the annular surface 196 and castellations 195 of the high speed gear ring gear 176. The other ball bearing 207 of each pair engages a first surface 211 of the adjustment mode switch ring 210. When the adjustment mode switch ring 210 is rotated about the axis X the ball bearing 206 slides over the first surface 211 until it reaches one of a plurality of apertures 212 in the adjustment mode switch ring 210. Each aperture 212 is in the form of a slot in an inner radial surface 213 of the switch ring 210. A second surface 215 of the switch ring 210 opposite the first surface 211 engages a flange 216 on the second side 205 of the stationary member 201. The flange 216 prevents movement of the switch ring 210 in the direction of the axis X away from the high speed gear ring gear 176.

The mode of operation of the adjustment mode torque control 200 is as follows. The adjustment mode switch ring 210 rotates about the axis X between an adjustment mode position in which the pair of ball bearings 206, 207 are received within the apertures 212 on the inner radial surface 213 of the switch ring 210 and a drive mode position in which the ball bearings 206, 207 are urged out of the apertures 212 and into engagement with the first surface 211 of the switch ring 210.

When the adjustment mode switch ring 210 is in the adjustment mode in which the pair of ball bearings 206, 207 are received within the apertures 212 on the inner radial surface 213 of the switch ring 210 the ball bearings 206, 207 engage against a first surface 226 of the flat washer 225 while an opposite second surface 227 of the flat washer 225 engages against a first surface 221 of the wave washer 220. An opposite second surface 222 of the wave washer 220 abuts against an annular surface 223 of the first housing portion 258 in abutment with the motor 30. The resilience of the wave washer 220 biases the flat washer 225 which in turn biases the bearings 206, 207 into engagement with the annular surface 196 of the high speed gear ring gear 176.

When the motor 30 is operated the armature 175 rotates which in turn causes the sun gear 174 to rotate. Rotation of the sun gear 174 causes the planet gears 173 to rotate. Because the planet gears 173 mesh with the high speed gear ring gear 176 when the planet gears 173 rotate they apply a rotational force to the high speed gear ring gear 176. This is turn causes the inclined surfaces 197,198 of the castellations 195 to engage the bearings 206, 207. The amount of biasing force that the wave washer 220 applies to the flat washer 225 determines the force of engagement of the bearings 206, 207 against the inclined surfaces 197, 198 of the castellations 195 of the high speed gear ring gear 176. Thus, the amount of biasing force that the wave washer 220 applies to the flat washer 225 determines the amount of torque that the armature 175 of the motor 30 may apply through the sun gear 174 and the planet gears 173 before the high speed gear ring gear 176 begins to rotate such that the bearings 206, 207 pass over the castellations 195. When the high speed gear ring gear 176 begins to rotate it becomes no longer a stationary gear but a rotating gear. As a result, rotation of the armature 175 is not transmitted to the spindle gear 156 and, hence, is not transmitted to the driven member 70. Thus, the adjustment mode torque control means 200 facilitates a threshold amount of torque applied by the motor 30 to the driven member 70 through the drive train 5 beyond which the adjustment mode torque control means 200 prevents the transmission of rotation altogether.

As mentioned herein, the drive shaft 80 transmits rotation supplied by the motor 30 to the head portion 76 of the driven member 70. The arrangement of the adjusting nut 72, the jaws 85 and the head portion 76 are such that rotation of the head portion 76 due to rotation of the drive shaft 80 driven by the motor 30 causes the jaws 85 to rotate about the axis X. Thus, the adjustment mode torque control means 200 controls the amount of torque applied by the motor 30 via the drive shaft 80 to the driven member 70 when the tool 1 is in the adjustment mode. In other words, the adjustment mode torque control means 200 operates by clutching the drive shaft 80 which rotates the driven member 70.

Figure 18:
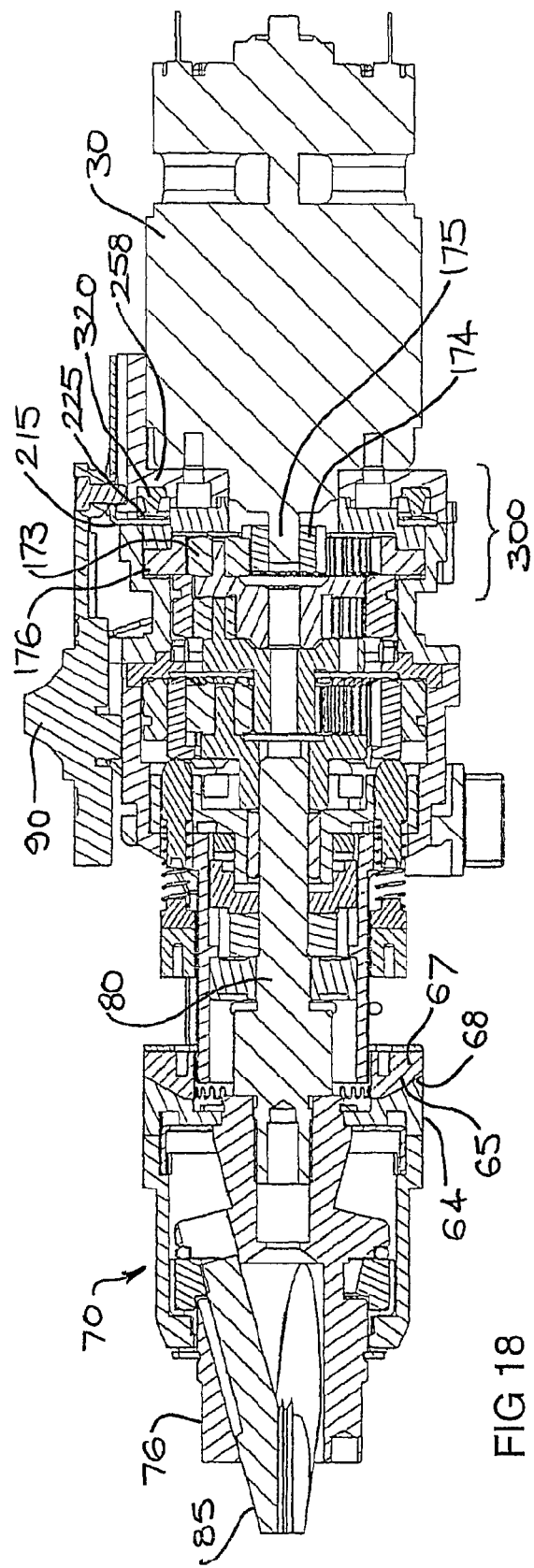
FIG. 18 is an illustration of a cross section of another embodiment of the drive train shown in FIG. 10 in which the adjustment torque control means incorporates a biasing means in the form of a resilient ring shaped member.
Figure 19:
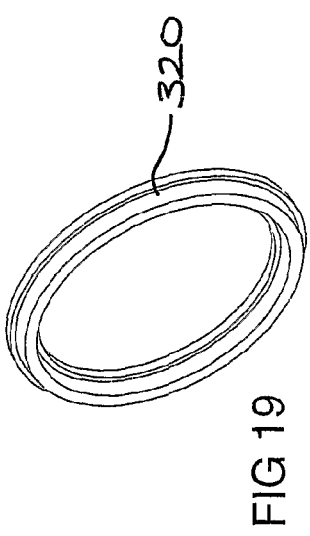
FIG. 19 is an illustration of a perspective view of the resilient ring biasing means of the adjustment torque control means of the embodiment of FIG. 18.

Although in the illustrated embodiment, the wave washer 220 is used to bias the flat washer 225 which in turn biases the bearings 206, 207 into engagement with the annular surface 196 of the high speed gear ring gear 176 it is to be appreciated that other forms of resilient means may be used such as a resilient polymer or rubber washer, a coil spring, a plurality of coil springs or any other equivalent biasing means For example, in another embodiment of the adjustment torque control means 300, which is illustrated in FIGS. 18 and 19 and in which like reference numerals depict like features, the wave washer 220 used to bias the flat washer 225 is substituted by a ring 320 formed out of resilient material such as rubber or the like. The ring 320 is in the form of an O-ring and is positioned between the second surface 227 of the flat washer 225 and the annular surface 223 of the first housing portion 258 in abutment with the motor 30. Similar to the function of the wave washer 220 described above, the resilience of the ring 320 biases the flat washer 225 which in turn biases the bearings 206, 207 into engagement with the annular surface 196 of the high speed gear ring gear 176. Although the ring 320 illustrated in the embodiment of FIGS. 18 and 19 are in the form of a completed ring it is to be appreciated that the ring 320 may be made up of detached or attached ring segments.

Figure 20:
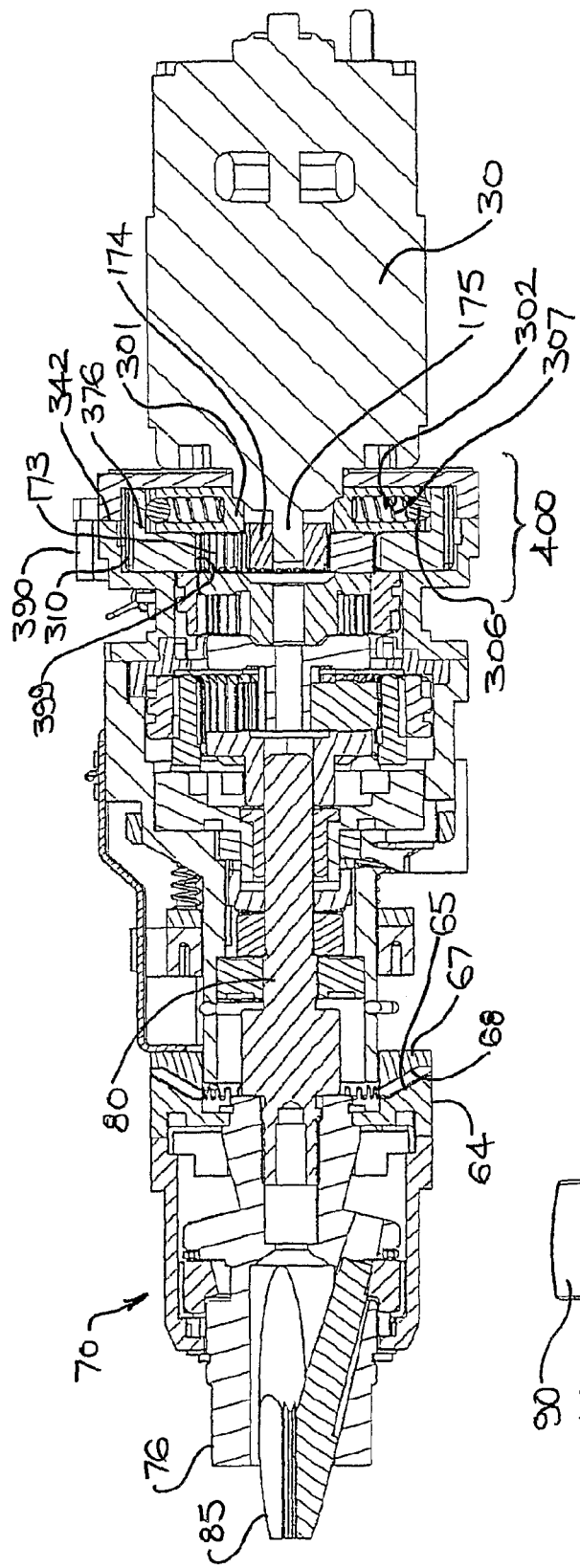
FIG. 20 is an illustration of a cross section of another embodiment of the drive train shown in FIG. 10 which includes an alternative form of the adjustment torque control means.
Figure 21:
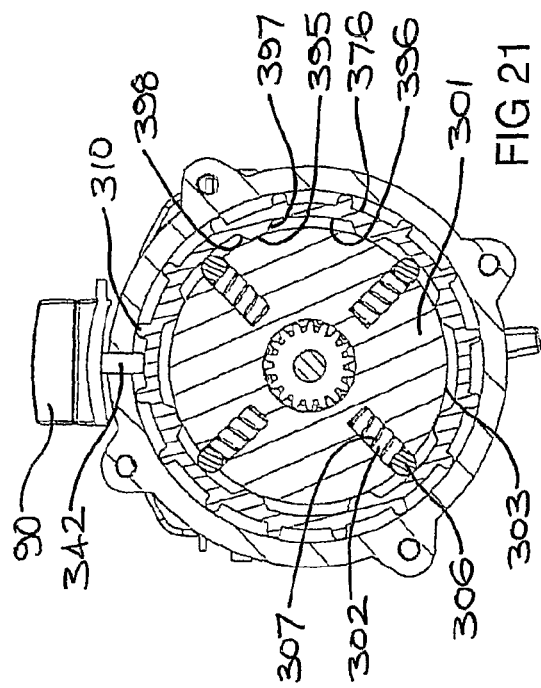
FIG. 21 is an illustration of a cross section of the adjustment torque control means taken along the section line A-A in FIG. 20.

In yet another embodiment of the adjustment torque control means 400, which is illustrated in FIGS. 20 and 21 and in which like reference numerals depict like features, an alternative form of clutching is used. This embodiment of the adjustment torque control means 400 includes an alternative form of the high speed gear ring gear 376, which instead of including axially extending castellations 195 as in the high speed gear ring gear 176 of the previous embodiments, has radially extending castellations 395 which extend radially inwardly.

The high speed sun gear 174, which is connected to the armature 175 projecting from the motor 30, meshes with each of the high speed planet gears 173 as in the previous embodiments. The high speed planet gears 173 also mesh with the high speed gear ring gear 376 and in particular with radially inwardly projecting splines 399 of the high speed gear ring gear 376. The high speed gear ring gear 376 can be selectively maintained in a stationary position whereby it does not rotate about the axis X as with the previous embodiments but the way in which this is achieved is different in the present embodiment.

When the high speed gear ring gear 376 is maintained stationary, and rotation of the armature 175 caused by activation of the motor 30 causes rotation of the sun gear 174 about the axis X, the high speed planet gears 173, which mesh with the high speed sun gear 174 and the high speed gear ring gear 376, rotate about the axis X which in turn causes rotation of the spindle gear 156 about the axis X. As long as the high speed gear ring gear 376 is maintained stationary then rotation of the armature 175 will transmit into rotation of the spindle gear 156 at a lower relative speed to the speed of rotation of the armature 175 of the motor 30. This corresponds to the first rate of rotation reduction caused by the gearbox 150.

As illustrated in FIG. 21, the castellations 395 project from an annular inner surface 396 of the high speed gear ring gear 376. Each castellation 395 includes a pair of inclined surfaces 397,398 that are inclined relative to the annular surface 396. The annular surface 396 and the castellations 395 face radially inwardly towards of a disc shaped stationary member 301. The stationary member 301 includes a plurality of openings 302 within a circumferential surface 303 thereof. Within each opening 302 is ball bearing 306 mounted on any suitable type of biasing means 307, which in the illustrated embodiment is in the form of a spring, received within the opening 304. Although the biasing means 307 in this embodiment is a helical coil spring, any other suitable type of biasing means could be used such as a resiliently flexible member made of metal or a plug-like member made of a resilient material such as a rubber or an elastomeric material. The ball bearing 306 engages the annular surface 396 and castellations 395 of the high speed gear ring gear 376.

A switch 390 includes a projection 342 which is selectively positionable between radially outwardly extending ridges 310 of the high speed gear ring gear 376 to selectively prevent rotation of the high speed gear ring gear 376. When the switch 390 is in, say, the first position the projection 342 is not positioned between the radially outwardly extending ridges 310 of the high speed gear ring gear 376 to selectively enable rotation of the high speed gear ring gear 376 and thereby engage the adjustment torque control means 400. When the switch 390 is in, say, the second or third positions the projection 342 is positioned between the radially outwardly extending ridges 310 of the high speed gear ring gear 376 to selectively prevent any rotation of the high speed gear ring gear 376 and thereby disengage the adjustment torque control means 400.

When rotation of the high speed gear ring gear 376 is selectively enabled and the motor 30 is operated, the ball bearings 306 engage the inclined surfaces 397,398 of each castellation 395. Because the stationary member 301 does not rotate about the axis X the ball bearings 307 also do not rotate about the axis X. The amount of biasing force that the biasing means 307 applies radially outwardly to each ball bearing 306 determines the force of engagement of the ball bearings 306 against the inclined surfaces 397, 398 of the castellations 395 of the high speed gear ring gear 376 which in turn determines the amount of torque that the armature 175 of the motor 30 may apply through the sun gear 174 and the planet gears 173 before the high speed gear ring gear 376 begins to rotate relative to the stationary member 301 and about the axis X such that the bearings 306 pass over the castellations 395. When the high speed gear ring gear 376 begins to rotate it becomes no longer a stationary gear but a rotating gear. As a result, rotation of the armature 175 is not transmitted to the spindle gear 156 and, hence, is not transmitted to the driven member 70. Thus, the adjustment mode torque control means 400 facilitates a threshold amount of torque applied by the motor 30 to the driven member 70 through the drive train 5 beyond which the adjustment mode torque control means 400 prevents the transmission of rotation altogether.

On the other hand, when the high speed gear ring gear 376 is prevented from any rotation when either the torque is not high enough when the power tool is in the adjustment mode or at any torque level when the power tool 1 is in the drive mode then the high speed gear ring gear 376 acts as a stationary ring gear. Thus, rotation of the armature 175 when the motor 30 is operated is transmitted to the spindle gear 156 and, hence, is transmitted to the driven member 70. Thus, the adjustment mode torque control means 400 facilitates a threshold amount of torque applied by the motor 30 to the driven member 70 through the drive train 5 below which the adjustment mode torque control means 400 allows the transmission of rotation. Also, the adjustment mode torque control means 400 can be disengaged so that at any amount of torque applied by the motor 30 to the driven member 70 through the drive train 5 the adjustment mode torque control means 400 allows the transmission of rotation.

When the adjustment mode switch ring 210 is in the drive mode position, as mentioned above, the ball bearings 206, 207 are urged out of the apertures 212 and into engagement with the first surface 211. The ball bearings 206, 207 also engage the annular surface 196 of the high speed gear ring gear 176. The distance between the first surface 211 of the switch ring 210 and the annular surface 196 of the high speed gear ring gear 176 is the same as the combined diameters of the ball bearings 206, 207. The engagement of the second surface 215 against the flange 216 prevents movement of the switch ring 210 away from the high speed gear ring gear 176. Thus, the ball bearings 206, 207 are engaged between the first surface 211 and the annular surface 196 such that the ball bearings 206, 207 are allowed no freedom of movement therebetween. Thus, when the adjustment mode switch ring 210 is in the drive mode position and the motor 30 is operated the sun gear 174 and the planet gears 173 rotate and, in turn, tend to apply a rotational force to the high speed gear ring gear 176. This in turn causes the inclined surfaces 197,198 of the castellations 195 to engage the bearings 206, 207. However, in contrast to the adjustment mode, when the adjustment mode switch ring 210 is in the drive mode position the bearings 206, 207 do not move over the castellations 195 because the ball bearings 206, 207 do not have freedom of movement between the first surface 211 and the annular surface 196 in the direction of the axis X. Accordingly, the high speed gear ring gear 176 does not rotate and because the high speed gear ring gear 176 does not rotate it acts as a stationary gear to cause rotation of the armature 175 to be transmitted to the spindle gear 156 and, hence, through the drive train 5 to the driven member 70.

The resilient force of the wave washer 220 is pre-determined such that when the adjustment mode torque control means 200 is in the adjustment mode a predetermined amount of torque will be applied to the driven member 70 before the high speed gear ring gear 176 will begin to rotate. The amount of torque is insufficient to crush or damage the shank of a working element, components of the drive train 5 or the driven member 70 but is sufficient to enable the gripping face 87 of each jaw 85 to grip the shank of a working element.

Although the embodiment described above and illustrated in the Figures provides a single predetermined torque setting for the adjustment mode torque control means 200 it is possible for the adjustment mode torque control means 200 to be configured to provide various torque settings. Furthermore, the adjustment mode torque control means 200 may also include a means for adjusting the adjustment mode torque control means 200 between the various torque settings. This may be useful in situations where different amounts of torque may be required in the adjustment mode of the power drill 1, or any other power tool incorporating the invention, for different types of working elements or for any other purpose. For example, if the jaws 85 of the driven member 70 are stuck and cannot be released from gripping the working element then a different setting providing a greater amount of torque may be selected when in the adjustment mode to facilitate the release of the working element.

As shown in FIGS. 11 to 15, the adjustment mode torque control means 200 includes a biasing spring 230. One end of the biasing spring 230 is fixedly coupled to the body 20 of the drill 1 whereas the other end is coupled to a spring mounting member 231 extending radially outwardly from the adjustment mode switch ring 210. The biasing spring 230 tends to bias the switch ring 210 about the axis X to the position in which the ball bearings 206, 207 are received within the apertures 212, that is the adjustment mode position of the switch ring 210. The switch ring 210 also has a radially outwardly extending protrusion 235. The protrusion 235 has a switch engaging flange 236 for engaging the switch 90. The switch engaging flange 236 has a sloped surface 240 which is sloped at an angle relative to the direction of the axis X. The sloped surface 240 is configured to be engaged by an adjustment mode switch ring engaging portion 242 of the switch 90.

The engaging portion 242 of the switch 90 is configured to be disengaged from the sloped surface 240 when the switch 90 is in the first position, which corresponds to the adjustment mode of the driven member. Thus, the biasing spring 230 acts to rotate the switch ring 210 about the axis X to the adjustment mode position in which the adjustment mode torque control means 200 is active. When the switch 90 is moved from the first position to the second position the switch ring engaging portion 240 progressively engages the sloped surface 240 to urge the switch ring 210 to rotate about the axis X and overcome the opposing biasing force of the biasing spring 230. Thus, movement of the switch 90 to its second position disengages the adjustment mode torque control means 200. Similarly, when the switch 90 is subsequently moved from the second position to the third position the switch ring engaging portion 242 continues to engage the switch engaging flange 238 so as to maintain the switch ring 210 in the drive mode position and, in turn, continues to disengage the adjustment mode torque control means 200.

As can be appreciated from the above, when the switch 90 is in the first position, as illustrated in FIGS. 11 to 13, the second member 67 is in engagement with the first member. 64 of the mechanical assembly 59 to facilitate adjustment of the driven member 70 for gripping and releasing the working element and the adjustment mode torque control means 200 is operable for restricting the amount of torque transferred from the armature 175 of the motor 30 through the drive train 5 to the driven member 70 to prevent damage to the working element or the drive train 5. Furthermore, when the switch 90 is in the first position the drive mode torque control means 110 is disengaged and does not affect the amount of torque transmitted from the armature 175 of the motor 30 through the drive train 5 to the driven member 70. Furthermore, when the switch 90 is in the first position the gearbox switching ring gear 160 of the gearbox 150 is in a position in corresponding to the high speed setting of the gearbox 150.

When the switch 90 is in the second position, as illustrated in FIGS. 14 and 15, the second member 67 is not in engagement with the first member 64 of the mechanical assembly 59.

Thus, the driven member 70 is in the drive mode and drives rotation of the working element. Also, when the switch 90 is in the second position the adjustment mode torque control means 200 is disengaged and does not affect the amount of torque transmitted from the armature 175 of the motor 30 through the drive train 5 to the driven member 70. However, when the switch 90 is in the second position the drive mode torque control means 110 is engaged and restricts the amount of torque transferred from the armature 175 of the motor 30 through the drive train 5 and the drive shaft 80 thereof to the driven member 70 to an amount predetermined by adjustment between the discreet torque settings of the drive mode torque control means 110 by relative rotation of the adjustment ring 260 and the threaded ring 280. Furthermore, in the second position of the switch 90 the gearbox switching ring gear 160 of the gearbox 150 is again in the position corresponding to the high speed setting of the gearbox 150.

When the switch 90 is in the third position, as illustrated in FIGS. 16 and 17, the second member 67 is not in engagement with the first member 64 of the mechanical assembly 59. Thus, the driven member 70 is in the drive mode and drives rotation of the working element. Also, when the switch 90 is in the third position the adjustment mode torque control means 200 is disengaged and does not affect the amount of torque transmitted from the armature 175 of the motor 30 through the drive train 5 to the driven member 70. However, when the switch 90 is in the third position the drive mode torque control means 110 is engaged and restricts the amount of torque transferred from the armature 175 of the motor 30 through the drive train 5 and the drive shaft 80 thereof to the driven member 70 to an amount predetermined by adjustment between the discreet torque settings of the drive mode torque control means 110 by relative rotation of the adjustment ring 260 and the threaded ring 280. Up to this point, the third position of the switch 90 is no different to the second position. However, in contrast to the second position of the switch 90, when the switch 90 is in the third position the gearbox switching ring gear 160 of the gearbox 150 is in the position corresponding to the low speed setting of the gearbox 150. That is, the gearbox switching ring gear 160 is in the position in which it meshes with the low speed planet gears 151 but does not mesh with the spindle gear 156 such that the speed of rotation transmitted from the armature 175 of the motor 30 is reduced in two stages through the gearbox 150. Thus, when the switch is in the third position, associated with the low speed setting of the gearbox 150, the driven member 70 rotates at a speed that is relatively slower than that at which it rotates in the high speed setting of the gearbox 150 associated with the second and first positions of the switch 90.

Although not illustrated in the Figures, the power tool 1 may have only a single speed setting rather than the two speed settings provided by the gearbox 150. Accordingly, in another form the power tool 1 include a single speed form of the gearbox 150 or may omit the gearbox 150 altogether yet still incorporate the adjustment mode torque control means 200 and the drive mode torque control means 110. Accordingly, the switch 90 may include only a first position and a second position. In the first position the switch 90 operates the adjustment mode torque control means 200 and selects the adjustment mode of the driven member 70 by engaging the first engagement portion 65 of the first member 64 with the second engagement portion 68 of the second member 67. In the second position the switch 90 operates the drive mode torque control means 110 and selects the drive mode of the driven member 70 by disengaging the first engagement portion 65 of the first member 64 from the second engagement portion 68 of the second member 67.

Although not illustrated in the Figures, the switch 90 may include a fourth position. In the fourth position of the switch 90 the second member 67 is in engagement with the first member 64 of the mechanical assembly 59 to facilitate adjustment of the driven member 70 for gripping and releasing the working element and the adjustment mode torque control means 200 is operable for restricting the amount of torque transferred from the armature 175 of the motor 30 through the drive train 5 to the driven member 70 to prevent damage to the working element or the drive train 5. Furthermore, when the switch 90 is in the fourth position the drive mode torque control means 110 is disengaged and does not affect the amount of torque transmitted from the armature 175 of the motor 30 through the drive train 5 to the driven member 70. Furthermore, when the switch 90 is in the fourth position the gearbox switching ring gear 160 of the gearbox 150 is in a position in corresponding to the low speed setting of the gearbox 150.

The power drill 1 illustrated in the Figures and described above includes a drive mode torque control means 110 and an adjustment mode torque control means 200 and a means for adjusting the driven member 70 between the drive mode and the adjustment mode. The means for adjusting the driven member 70 includes a first member 64 having an axis of rotation, which in the illustrated embodiment is in line with the axis X, and a second member 67 having an axis, which in the illustrated embodiment is also in line with the axis X. In contrast to the first member 64, the second member 67 is not rotatable about the axis X. The first member 64 includes a first engagement portion 65 inclined relative to the axis X and the second member 67 includes a second engagement portion 68 that is also inclined relative to the axis X. In the illustrated embodiment, the first engagement portion 65 and the second engagement portion 68 are both substantially frustoconical and/or bevelled and arranged to interengage and disengage upon relative movement of the first and second members 64, 67 in the direction of the axis X.

In another embodiment that is not illustrated in the Figures, the first member may include a first engagement portion that is substantially parallel to the axis X and the second member may include a second engagement portion that is also substantially parallel to the axis X. In this alternative arrangement, which is not illustrated in the Figures, the first engagement portion and the second engagement portion are both substantially cylindrical and arranged to interengage and disengage upon relative movement of the first and second members in the direction of the axis X. Thus, the first engagement portion may be formed from a plurality of elongated splines and elongated recesses for inter-engagement with a plurality of elongated splines and elongated recesses that form the second engagement portion wherein the splines and recesses are elongated and extend axially in the same direction as the axis X. In the case of the first member, the splines and recesses of the first engagement portion are oriented outwardly away from the axis X. Accordingly, the first member has a central gear configuration with axial radially outwardly extending splines. In contrast, in the second member the splines and recesses of the second engagement portion are oriented inwardly towards the axis X. Accordingly, the second member has a standard ring gear configuration with axial radially inwardly extending splines. However, an arrangement of the first and second members having cylindrical engagement portions would not advantageous like the frustoconical engagement portions of the other embodiments disclosed herein in reducing the overall length of the mechanical assembly, the drive train and the power tool in the direction of the axis X.

Finally it is to be understood that various alterations, modifications and/or additions may be introduced into the constructions and arrangements of the parts previously described without departing from the spirit or ambit of the invention.

The invention claimed is:

1. A mechanical assembly for a power tool, the mechanical assembly including:
a first member having a first axis and a first engagement portion inclined relative to the first axis;
a second member having a second axis and a second engagement portion inclined relative to the second axis;
wherein the first and second engagement portions engage each other by movement of the first and second members relative to each other in the direction of at least one of the axes; and
wherein the first member is a ring gear and the second member is a central gear and the first and second engagement portions engage and disengage each other by movement of the second member within a space defined within the first member.

2. The mechanical assembly of claim 1, wherein the first and second axes extend in the same direction and the first and second engagement portions engage each other by movement of the ring and central gears relative to each other in the direction of at least one of the axes.

3. The mechanical assembly of claim 1, wherein the first engagement portion is conical and the second engagement portion is conical.

4. The mechanical assembly of claim 1, wherein the first engagement portion includes elongated splines for mating with elongated recesses of the second engagement portion and the second engagement portion includes elongated splines for mating with elongated recesses of the first engagement portion, wherein each spline and recess is elongated in a direction converging with the axis of the gear with which the spline or recess is associated.

5. The mechanical assembly of claim 1, wherein the ring gear is rotatable relative to the first axis and the central gear is not rotatable relative to the second axis so that when the first and second engagement portions are in engagement the ring gear is prevented from rotating relative to the first axis.

6. The mechanical assembly of claim 5, wherein the ring gear is connected to a first thread in engagement with a second thread so that when the ring gear is prevented from rotating relative to the first axis, rotation of the second thread relative to the ring gear results in rotation of the first and second threads relative to each other and movement of the second thread in a linear path that is angularly displaced relative to the first axis.

7. The mechanical assembly of claim 1 wherein the mechanical assembly is incorporated in a power tool.

8. The mechanical assembly of claim 1, wherein at least part of the mechanical assembly forms part of a chuck of a power drill.

9. The mechanical assembly of claim 8, wherein the mechanical assembly is operable for providing adjustment and drive modes for the chuck.

10. A power tool including:
a power tool body;
a rotatable driven member being operable for releasably gripping a working element, the driven member having a drive mode in which rotation of the driven member drives the working element relative to the power tool body and an adjustment mode in which rotation of the driven member causes the driven member to either grip the working element or release the working element or both; and
an assembly for adjusting, the driven member between the modes including a first member having a first axis and a first en engagement portion inclined relative to the first axis and a second member having a second axis and a second engagement portion inclined relative to the second axis,
wherein the first and second engagement portions engage each other by movement of the first and second members relative to each other in the direction of at least one of the axes; and wherein engagement between the first and second engagement portions adjusts the driven member to the adjustment mode and disengagement between the first and second engagement portions adjusts the driven member to the drive mode; and
wherein the first member is a ring gear and the second member is a central gear and the first and second engagement portions engage and disengage each other by movement of the second member within a space defined within the first member.

11. The power tool of claim 10, wherein the first and second axes extend in the same direction and the first and second engagement portions engage and disengage each other by movement of the ring and central gears relative to each other in the direction of the axes.

12. The power tool of claim 10, wherein the first engagement portion is conical and the second engagement portion is conical.

13. The power tool of claim 10, wherein the first engagement portion includes elongated splines for mating with elongated recesses of the second engagement portion and the second engagement portion includes elongated splines for mating with elongated recesses of the first engagement portion, wherein each spline and recess is elongated in a direction converging with the axis of the gear, with which the spline or recess is associated.

14. The power tool of claim 10, wherein the ring gear is rotatable relative to the first axis and the central gear is not rotatable relative to the second axis so that when the first and second engagement portions are in engagement the ring gear is prevented from rotating relative to the first axis.

15. The power tool of claim 14, wherein the driven member includes a jaw member for releasably gripping the working element, the ring gear including a first thread and the jaw member including a second thread in engagement with the first thread so that when the ring gear is prevented from rotating relative to the first axis, rotation of the jaw member relative to the ring gear caused by rotation of the driven member results in rotation of the first and second threads relative to each other and movement of the jaw member in a linear path that is angularly displaced relative to the first axis.

16. The power tool of claim 10, further including an actuator member for moving the first and second members relative to each other in the direction of at least one of the first and second axes.

17. The power tool of claim 16, wherein the actuator member is movable between a first setting in which the actuator member biases the ring and central gears towards each other to cause engagement between the first and second engagement portions and a second setting in which the actuator member biases the ring and central gears away from each other to cause disengagement between the first and second engagement portions.

18. A power tool including:
a power tool body;
a rotatable driven member being operable for releasably gripping a working element, the driven member having a drive mode in which rotation of the driven member drives the working element relative to the power tool body and an adjustment mode in which rotation of the driven member causes the driven member to either grip the working element or release the working element or both;
a power drive for driving rotation of the driven member;
a first torque control device for controlling the amount of torque applied to the driven member by the power drive when in the drive mode; and
a second torque control device for controlling the amount of torque applied to the driven member by the power drive when in the adjustment mode.

19. The power tool of claim 18, wherein the first torque control device is operable for controlling the amount of torque applied to the driven member by the power drive in the drive mode and is not operable in the adjustment mode.

20. The power tool of claim 18, wherein the second torque control device is operable for controlling the amount of torque applied to the driven member by the power drive in the adjustment mode and is not operable in the drive mode.

21. The power tool of claim 18, wherein the first torque control device has a plurality of torque settings and is adjustable between the plurality of torque settings.

22. The power tool of claim 18, wherein the second torque control device has a single torque setting.

23. The power tool of claim 18, wherein the second torque control device has a plurality of torque settings and is adjustable between the plurality of torque settings.

24. The power tool of claim 18, further including a gearbox including a plurality of speed settings wherein in each one of the plurality of speed settings the gearbox is operable for converting rotation from the power drive into a respective relative speed of rotation of the driven member.

25. The power tool of claim 24, wherein the gearbox includes a first speed setting and a second speed setting, in the first speed setting the gearbox is operable for converting rotation from the power drive into a first speed of rotation of the driven member and in the second speed setting the gearbox is operable for converting rotation from the power drive into a second speed rotation of the driven member.

26. The power tool of claim 18, further including an adjustment assembly for adjusting the driven member between the drive mode and the adjustment mode.

27. The power tool of claim 26, wherein the adjustment assembly includes a first member having a first axis and a first engagement portion and a second member having a second axis and a second engagement portion.

28. The power tool of claim 27, wherein the first engagement portion extends in the same direction as the first axis and the second engagement portion extends in the same direction as the second axis, whereby the first engagement portion is cylindrical and the second engagement portion is cylindrical.

29. The power tool of claim 27, wherein the first and second axes extend in the same direction and the first and second engagement portions engage and disengage each other by movement of the first and second members relative to each other in the direction of the axes.

30. The power tool of claim 29, wherein engagement between the first and second engagement portions adjusts the driven member to the adjustment mode and disengagement between the first and second engagement portions adjusts the driven member to the drive mode.

31. The power tool of claim 29, wherein the adjustment assembly includes an actuator member for urging the first and second members relative to each other in the direction of the axes.

32. The power tool of claim 31, wherein the actuator member is movable between a first setting in which the actuator member urges the first and second members towards each other to cause engagement between the first and second engagement portions, and a second setting in which the actuator member urges the first and second members away from each other to cause disengagement between the first and second engagement portions.

33. The power tool of claim 32, further including a switch connected to the actuator member, the switch being actuable between a position in which the actuator member is in the first setting and a position in which the actuator member is in the second setting.

34. The power tool of claim 33, wherein the switch includes a first position and a second position, wherein in the first position the switch operates the second torque control device and the actuator member is in the first setting, and in the second position the switch operates the first torque control device and the actuator member is in the second setting.

35. The power tool of claim 27, wherein the first engagement portion is inclined relative to the first axis and the second engagement portion is inclined relative to the second axis, whereby the first engagement portion is conical and the second engagement portion is conical.

36. A power tool including:
a power tool body;
a rotatable driven member being operable for releasably gripping a working element, the driven member having a drive mode in which rotation of the driven member drives the working element relative to the power tool body and an adjustment mode in which rotation of the driven member causes the driven member to either grip the working element or release the working element or both;
a power drive for driving rotation of the driven member;
a first torque control device that is operable for controlling the amount of torque applied to the driven member by the power drive when in the drive mode;
a second torque control device that is operable for controlling the amount of torque applied to the driven member by the power drive when in the adjustment mode;
a gearbox including a first speed setting for converting rotation from the power drive into a first speed of rotation of the driven member, and a second speed setting for converting rotation from the power drive into a second speed of rotation of the driven member; and
a switch that includes a first position, a second position and a third position, wherein in the first position the switch operates the second torque control device and selects the adjustment mode, in the second position the switch operates the first torque control device and selects the drive mode and the first speed setting, and in the third position the switch operates the first torque control device and selects the drive mode and the second speed setting.

37. The power tool of claim 36, further including an actuator member connecting the switch to the driven member, whereby movement of the switch between the first, second and third positions causes the actuator member to actuate the driven member between the adjustment mode and the drive mode.

38. The power tool of claim 36, further including an adjustment assembly for adjusting the driven member between the drive mode and the adjustment mode.

39. The power tool of claim 38, wherein the adjustment assembly includes a first member having a first axis and a first engagement portion inclined relative to the first axis and a second member having a second axis and a second engagement portion inclined relative to the second axis.

40. The power tool of claim 39, wherein the first and second axes extend in the same direction and the first and second engagement portions engage and disengage each other by movement of the first and second members relative to each other in the direction of the axes.

41. The power tool of claim 40, wherein engagement between the first and second engagement portions results in the selection of the adjustment mode of the driven member, and disengagement between the first and second engagement portions results in selection of the drive mode of the driven member.

42. The power tool of claim 36, wherein the switch is a sliding switch which moves in a linear path.

43. The power tool of claim 36, wherein the switch is a rotating switch which rotates about an axis.

44. The power tool claim 36, wherein the first torque control device is a clutch including a plurality of torque settings.

45. The power tool of claim 36, wherein the second torque control device is a clutch including a single torque setting.

46. The power tool of claim 36, wherein the second torque control device is a clutch including a plurality of torque settings.

47. The power tool of claim 36, wherein the gearbox includes more than two speed settings wherein in each one of the speed settings the gearbox is operable for converting rotation from the power drive into a respective relative speed of rotation of the driven member.

48. The power tool of claim 36, wherein the switch includes a fourth position, wherein in the fourth position the switch operates the second torque control device and actuates the driven member to the adjustment mode and the gearbox to the second speed setting.

* * * * *

UNITED STATES PATENT AND TRADEMARK OFFICE
CERTIFICATE OF CORRECTION

PATENT NO. : 8,387,719 B2
APPLICATION NO. : 12/676559
DATED : March 5, 2013
INVENTOR(S) : David Leigh Scrimshaw et al.

Page 1 of 1

It is certified that error appears in the above-identified patent and that said Letters Patent is hereby corrected as shown below:

In the Claims

Claim 7, Column 29, Line 50, delete "claim 1" and insert -- claim 1, --.

Claim 10, Column 30, Line 1, delete "adjusting," and insert -- adjusting --.

Claim 10, Column 30, Line 3, after "first" delete "en".

Claim 13, Column 30, Line 34, delete "gear," and insert -- gear --.

Claim 44, Column 33, Line 17, delete "tool claim" and insert -- tool of claim --.

Signed and Sealed this
Tenth Day of February, 2015

Michelle K. Lee
*Deputy Director of the United States Patent and Trademark Office*

UNITED STATES PATENT AND TRADEMARK OFFICE
CERTIFICATE OF CORRECTION

PATENT NO. : 8,387,719 B2  Page 1 of 1
APPLICATION NO. : 12/676559
DATED : March 5, 2013
INVENTOR(S) : Scrimshaw et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 439 days.

Signed and Sealed this
First Day of September, 2015

Michelle K. Lee
*Director of the United States Patent and Trademark Office*